United States Patent
Kim et al.

(10) Patent No.: US 11,330,642 B2
(45) Date of Patent: May 10, 2022

(54) METHOD FOR SUPPORTING AND PROVIDING LADN SERVICE IN WIRELESS COMMUNICATION SYSTEM AND APPARATUS THEREFOR

(71) Applicant: LG ELECTRONICS INC., Seoul (KR)

(72) Inventors: Hyunsook Kim, Seoul (KR); Laeyoung Kim, Seoul (KR); Jinsook Ryu, Seoul (KR); Myungjune Youn, Seoul (KR)

(73) Assignee: LG Electronics Inc., Seoul (KR)

(*) Notice: Subject to any disclaimer, the term of this patent is extended or adjusted under 35 U.S.C. 154(b) by 35 days.

(21) Appl. No.: 16/763,453

(22) PCT Filed: Nov. 12, 2018

(86) PCT No.: PCT/KR2018/013737
§ 371 (c)(1),
(2) Date: May 12, 2020

(87) PCT Pub. No.: WO2019/098623
PCT Pub. Date: May 23, 2019

(65) Prior Publication Data
US 2020/0337093 A1    Oct. 22, 2020

Related U.S. Application Data

(60) Provisional application No. 62/586,183, filed on Nov. 15, 2017.

(30) Foreign Application Priority Data

May 11, 2018   (KR) .................. 10-2018-0054197

(51) Int. Cl.
*H04W 76/10*     (2018.01)
*H04W 8/02*      (2009.01)
(Continued)

(52) U.S. Cl.
CPC ............ *H04W 76/10* (2018.02); *H04W 8/02* (2013.01); *H04W 48/04* (2013.01); *H04W 64/00* (2013.01); *H04W 68/005* (2013.01)

(58) Field of Classification Search
CPC ....... H04W 4/02; H04W 4/029; H04W 76/00; H04W 76/10; H04W 76/11; H04W 64/00;
(Continued)

(56) References Cited

U.S. PATENT DOCUMENTS

2012/0113895 A1*  5/2012  Diachina et al. ............. 370/328
2012/0307732 A1   12/2012 Olsson et al.
(Continued)

FOREIGN PATENT DOCUMENTS

| EP | 3139677 A1 | 3/2017 |
| KR | 10-2010-0066508 A | 6/2010 |
| KR | 10-2011-0065973 A | 6/2011 |

OTHER PUBLICATIONS

3GPP. TSG SA; System Architecture for the 5G System; Stage 2 (Release 15), 3GPP TS 23.501 V1.5.0, Nov. 13, 2017.
(Continued)

*Primary Examiner* — Meless N Zewdu
(74) *Attorney, Agent, or Firm* — Dentons US LLP

(57) ABSTRACT

An aspect of the disclosure relates to a method for supporting a local access data network (LADN) service by an access and mobility management function (AMF) in a wireless communication system, and the method may comprise the steps of: providing LADN information for the LADN service to a terminal, wherein the LADN information includes LADN service area information and LADN data network name (DNN) information; acquiring location information of the terminal; when establishment of a packet data unit (PDU) session for providing the LADN service is determined on the basis of the location information of the
(Continued)

terminal, transmitting to the terminal a preset message including a request for the establishment of the PDU session; and receiving, from the terminal, a request message for initiating the establishment of the PDU session.

7 Claims, 12 Drawing Sheets

(51) Int. Cl.
   *H04W 48/04* (2009.01)
   *H04W 64/00* (2009.01)
   *H04W 68/00* (2009.01)

(58) Field of Classification Search
   CPC ....... H04W 68/00; H04W 48/04; H04W 8/02; H04W 4/50; H04W 68/005; H04W 68/02; H04W 76/27; H04W 36/0011; H04W 36/0016; H04W 36/0022; H04W 36/0033; H04W 36/0038; H04W 36/0044; H04W 64/003; H04W 72/00; H04W 72/04; H04W 72/02; H04W 88/00; H04W 88/02; H04W 88/08; H04W 88/18; H04W 48/17; H04W 48/18; H04W 4/30; H04L 29/0619; H04L 29/12754; H04L 65/1003; H04L 67/148; H04L 69/08; H04L 67/14
   See application file for complete search history.

(56) References Cited

U.S. PATENT DOCUMENTS

| | | | |
|---|---|---|---|
| 2015/0092547 A1* | 4/2015 | Wu et al. | H04W 28/0289 |
| 2018/0035403 A1* | 2/2018 | Yu | H04W 68/02 |
| 2018/0279397 A1* | 9/2018 | Faccin et al. | H04W 76/15 |
| 2019/0007500 A1* | 1/2019 | Kim et al. | H04L 67/141 |
| 2019/0116486 A1* | 4/2019 | Kim et al. | H04W 8/10 |
| 2019/0182788 A1* | 6/2019 | Lee et al. | H04W 60/00 |
| 2019/0239280 A1* | 8/2019 | Li et al. | H04W 72/04 |
| 2019/0246282 A1* | 8/2019 | Li et al. | H04W 12/10 |
| 2020/0092934 A1* | 3/2020 | Dou et al. | H04W 76/19 |
| 2020/0120751 A1* | 4/2020 | Sugawara et al. | H04W 80/10 |
| 2020/0120752 A1* | 4/2020 | Hu et al. | H04W 80/10 |
| 2020/0275296 A1* | 8/2020 | Chen et al. | H04W 24/10 |

OTHER PUBLICATIONS

3GPP.TSG SA; Procedures for the 5G System; Stage 2 (Release 15), 3GPP TS 23.502 V1.3.0, Nov. 14, 2017.
Nokia, Alcatel-Lucent Shanghai Bell, "23.501 § 5.6.5: LADN operation", SA WG2 Meeting #122, Jun. 26-30, 2017, S2-174316, XP051309395.
ZTE, "TS 23.501: Clarification on LADN", SA WG2 Meeting #123, Oct. 23-27, 2017, S2-177094, XP051359783.
International Search Report from PCT/KR2018/013737, dated Feb. 28, 2019.
Written Opinion of the ISA from PCT/KR2018/013737, dated Feb. 28, 2019.

* cited by examiner

[Fig. 1]
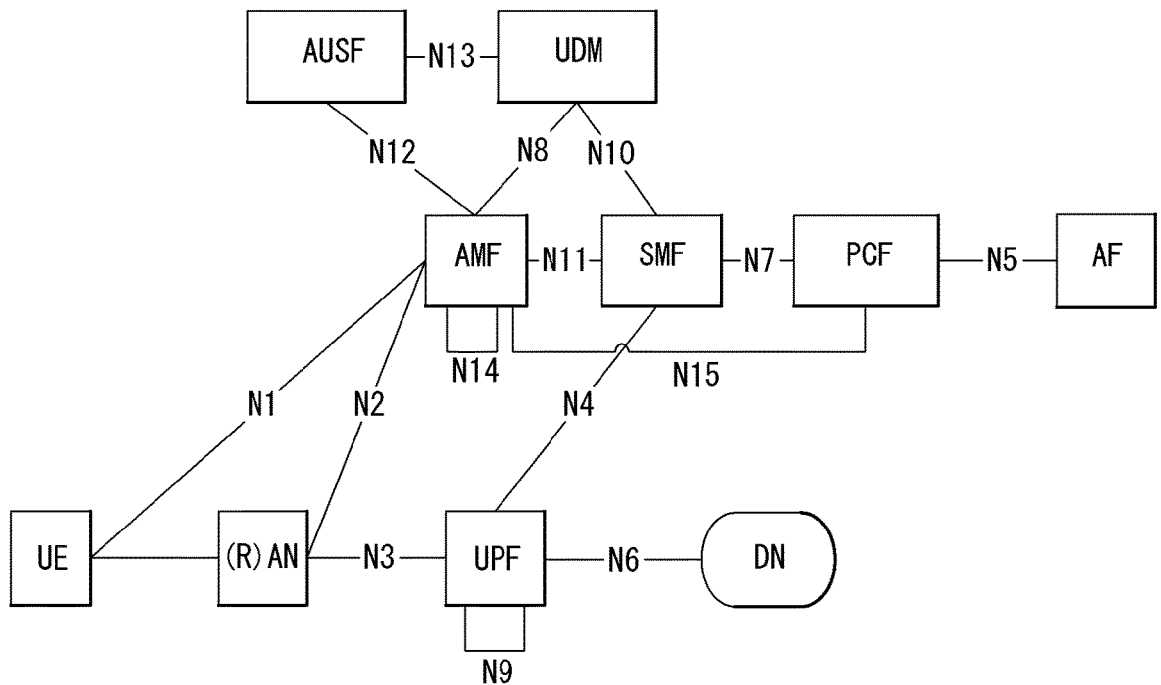
[Fig. 2]
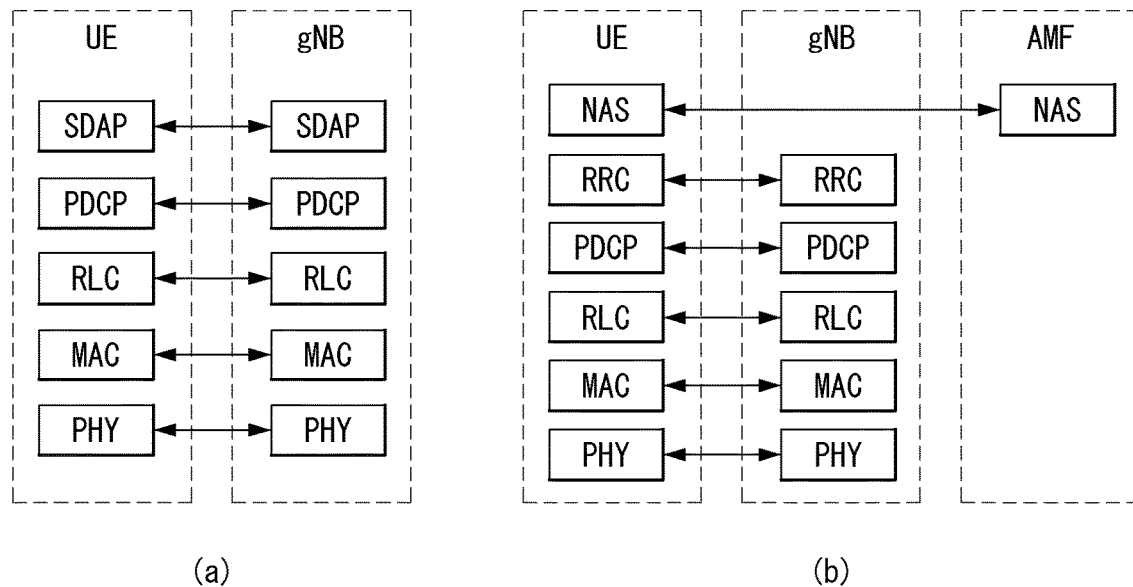
(a)                                    (b)

[Fig. 3]
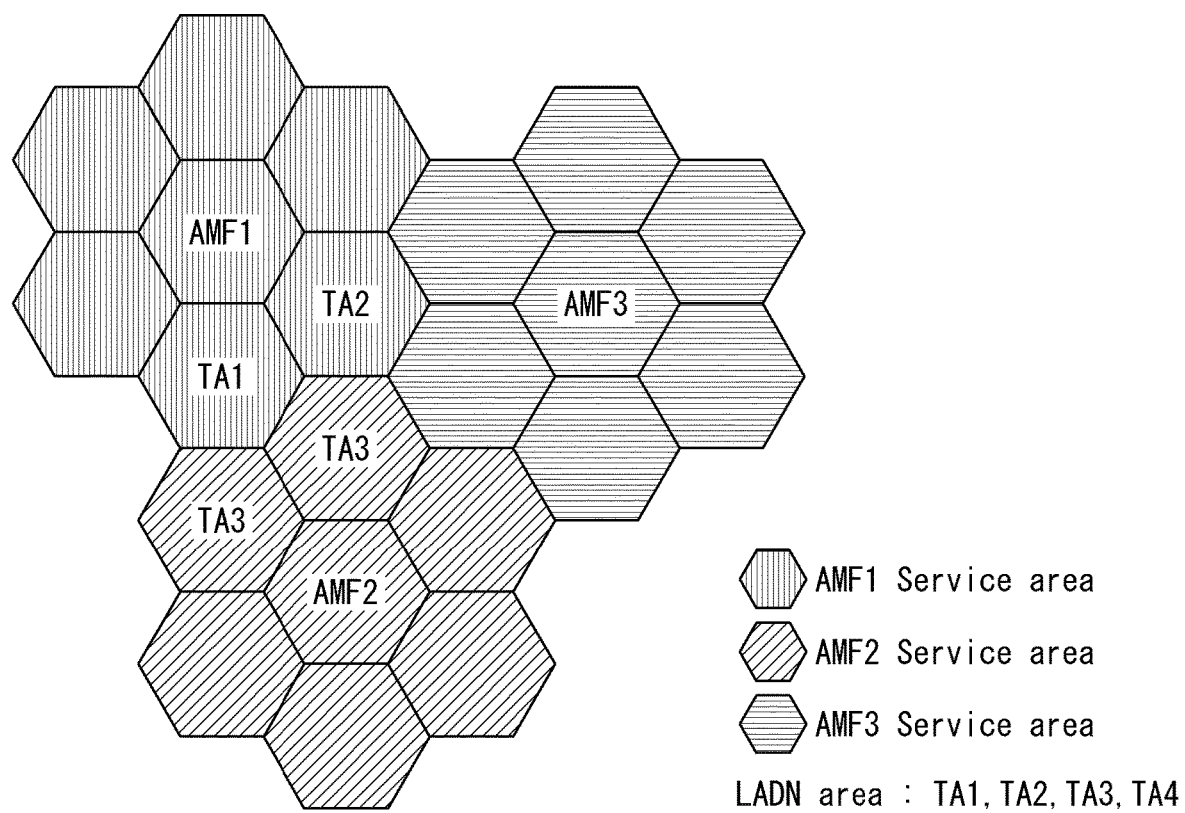

[Fig. 4]
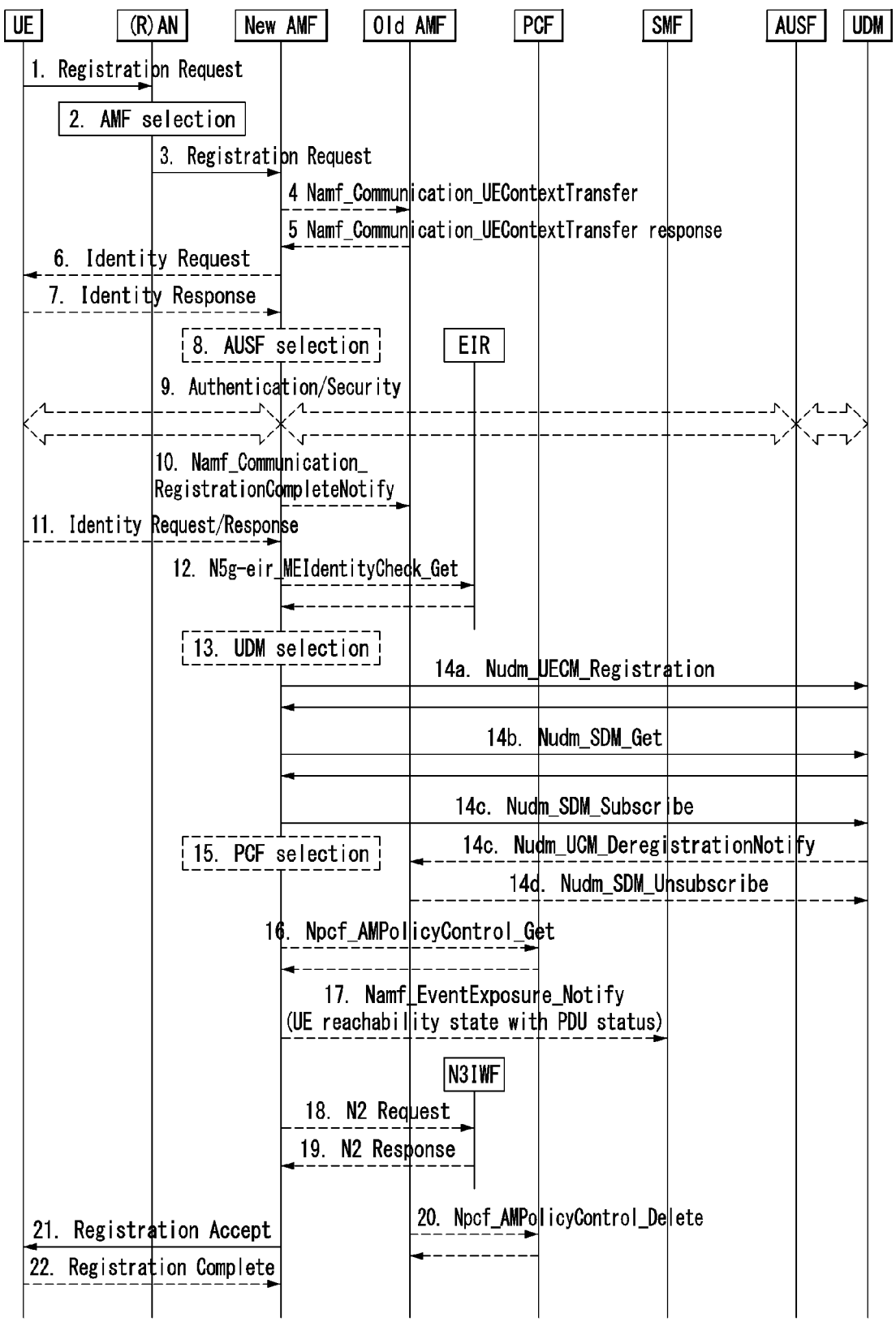

[Fig. 5]
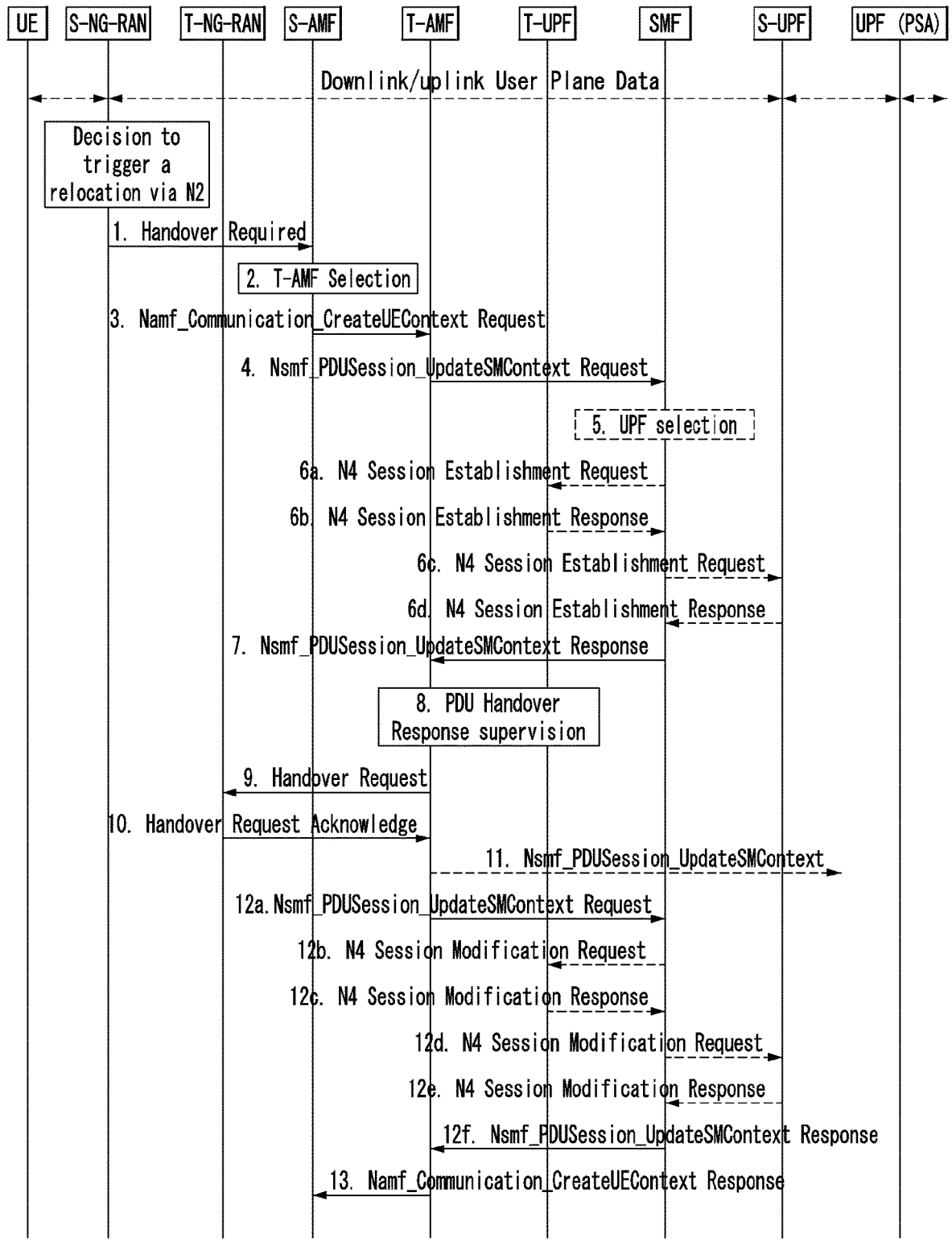

[Fig. 6]
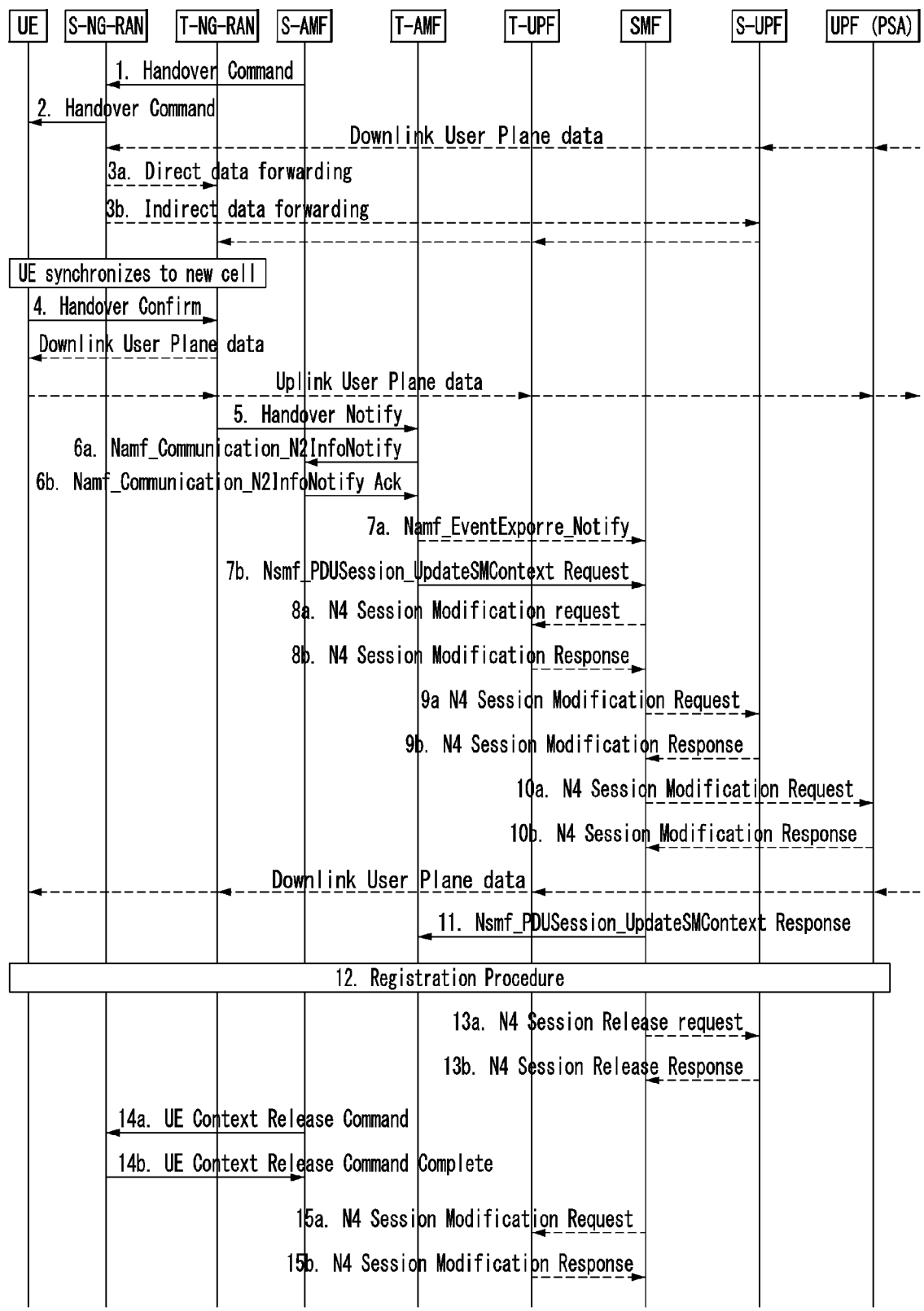

[Fig. 7]
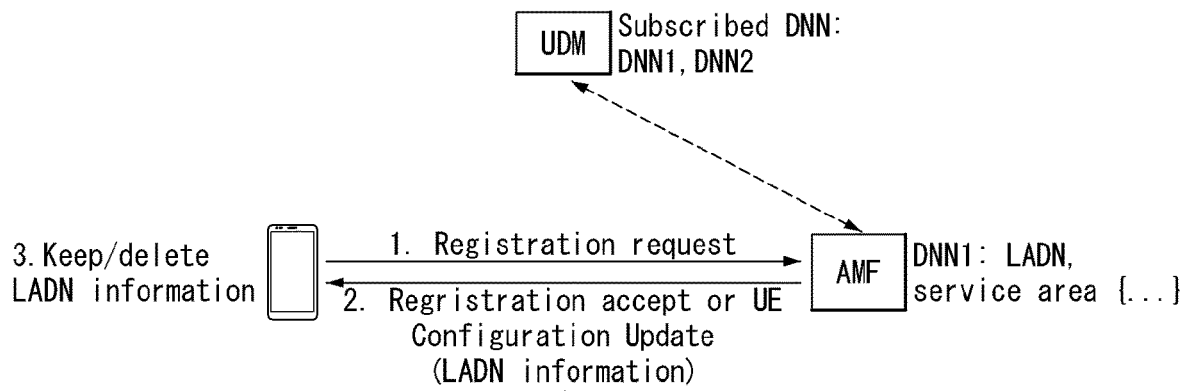
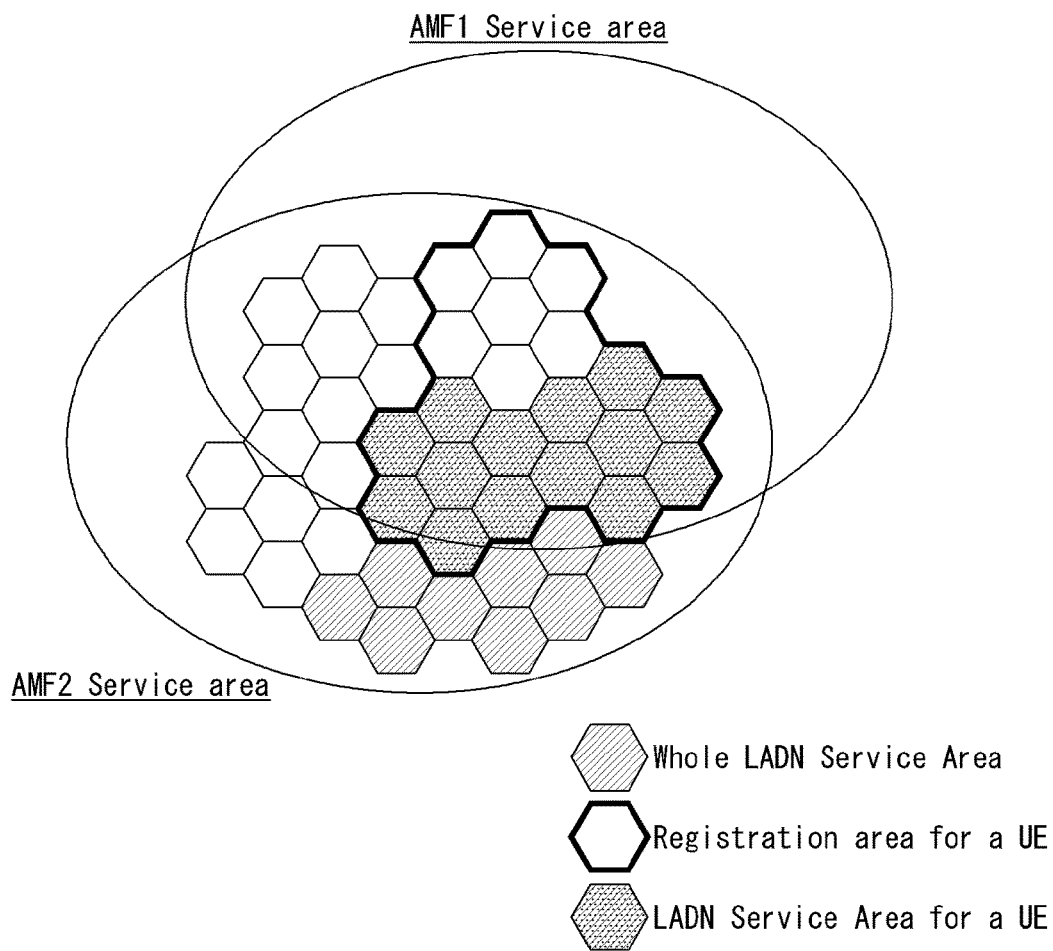

[Fig. 8]
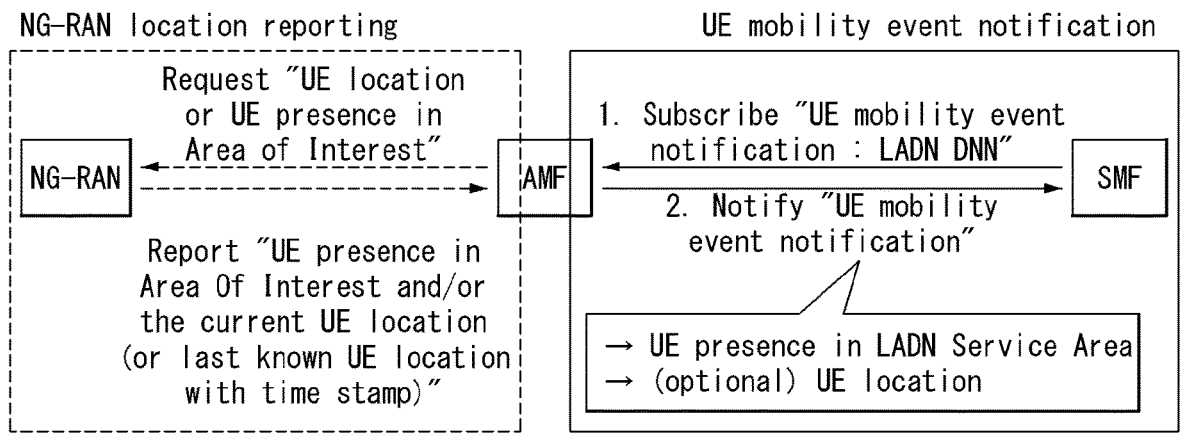
[Fig. 9]
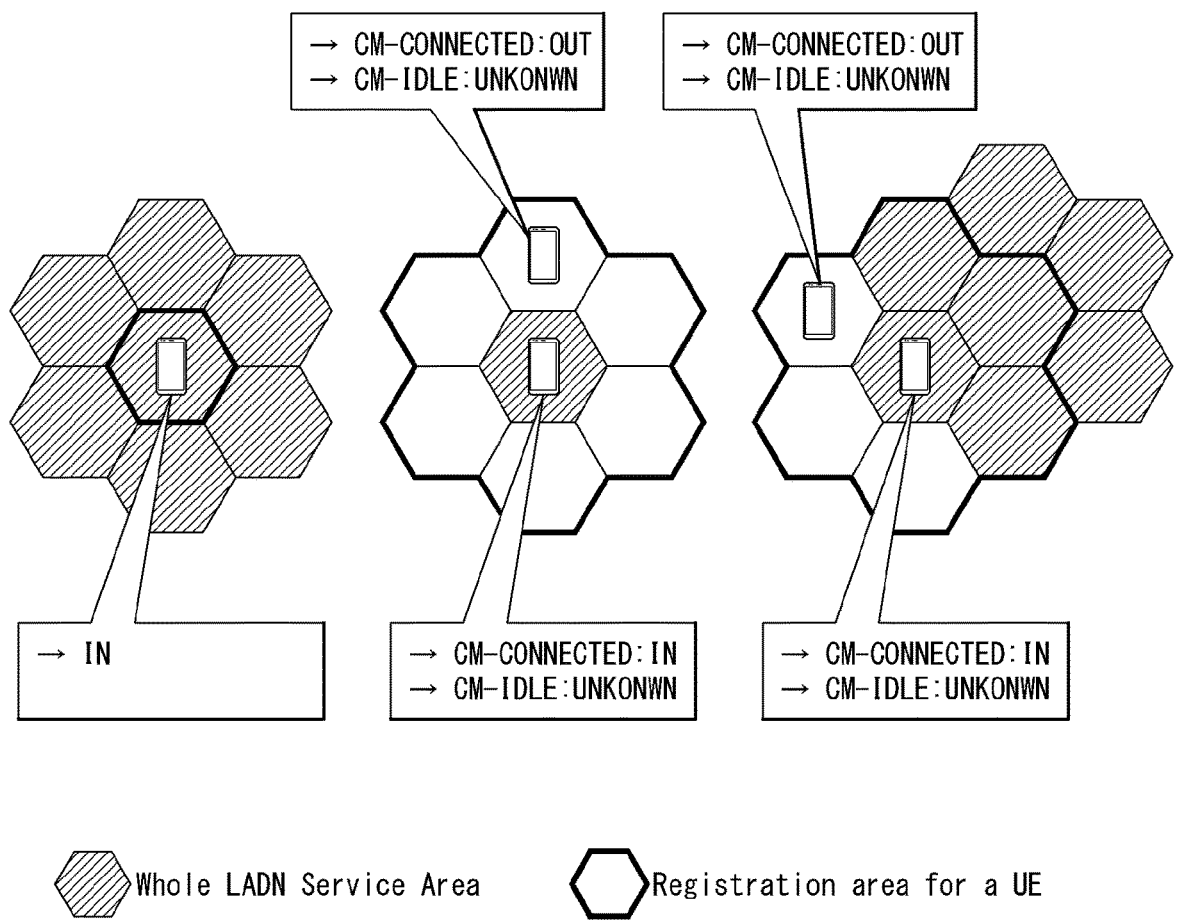

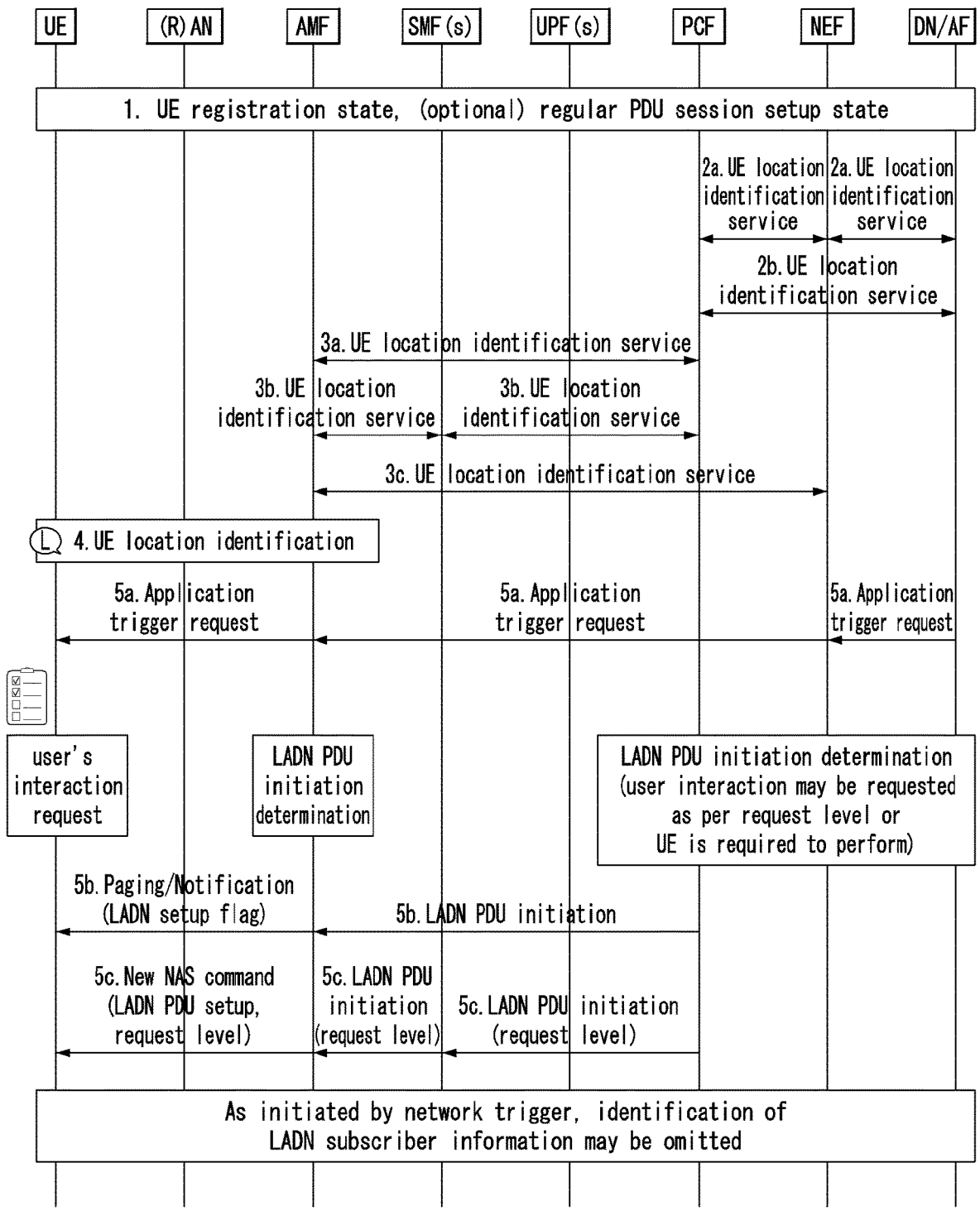

[Fig. 11]
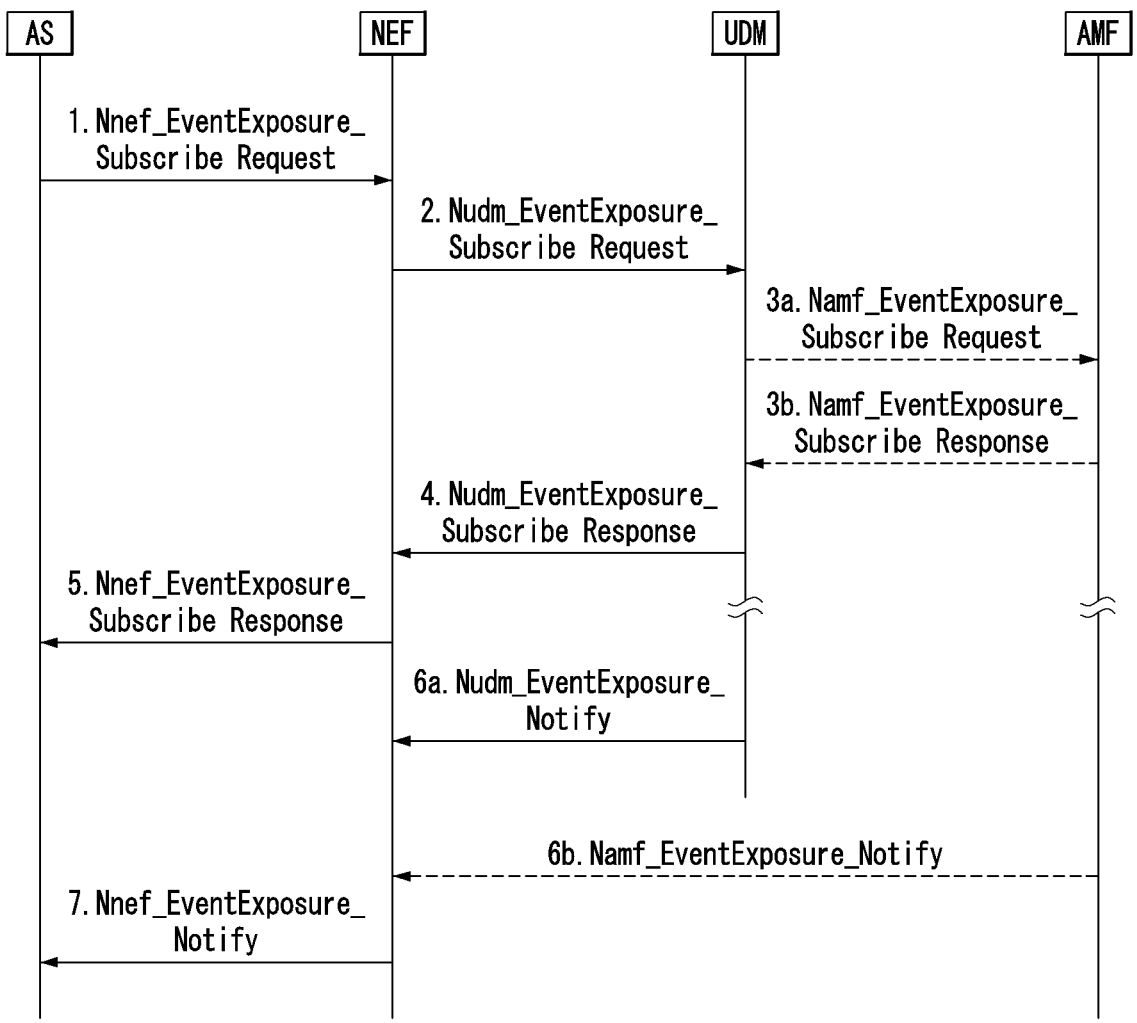

[Fig. 12]
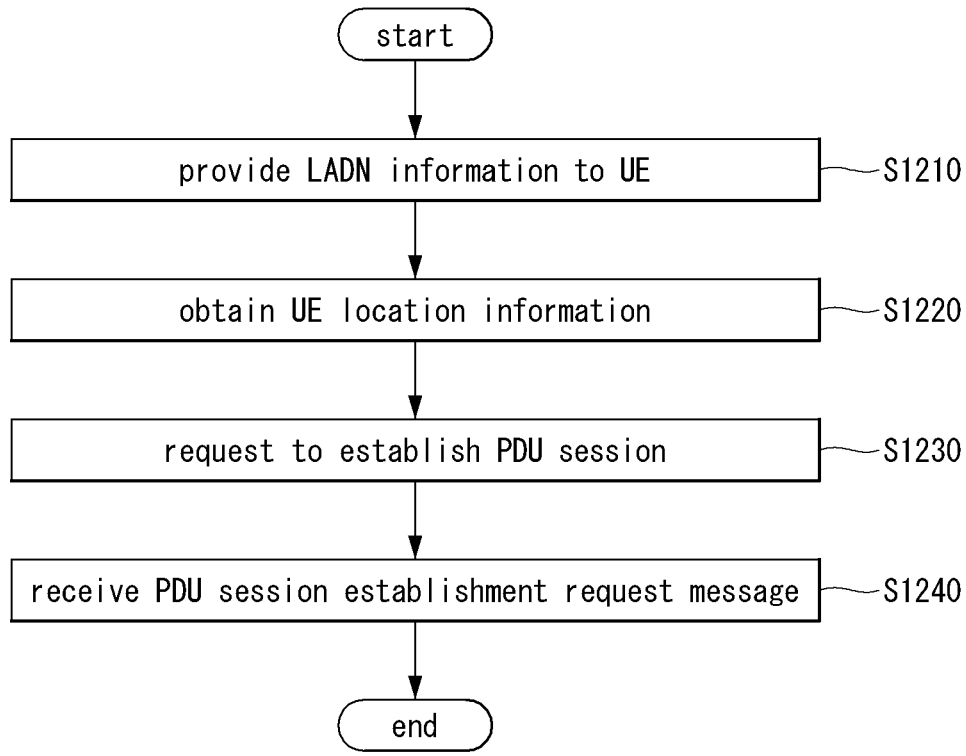
[Fig. 13]
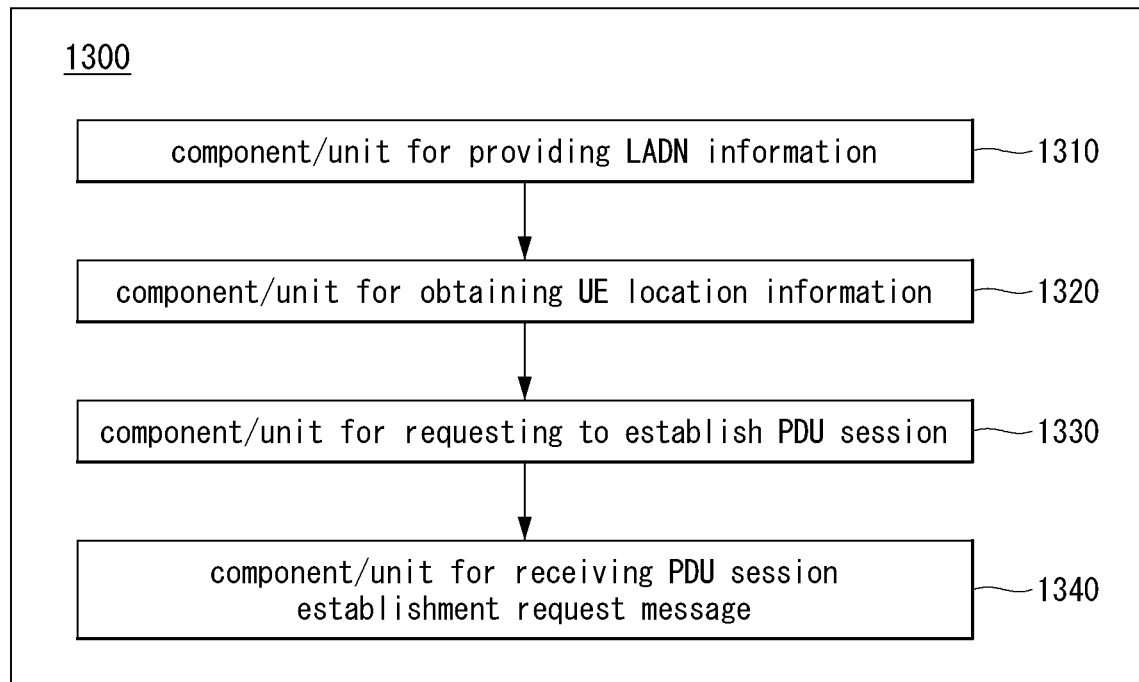

【Fig. 14】
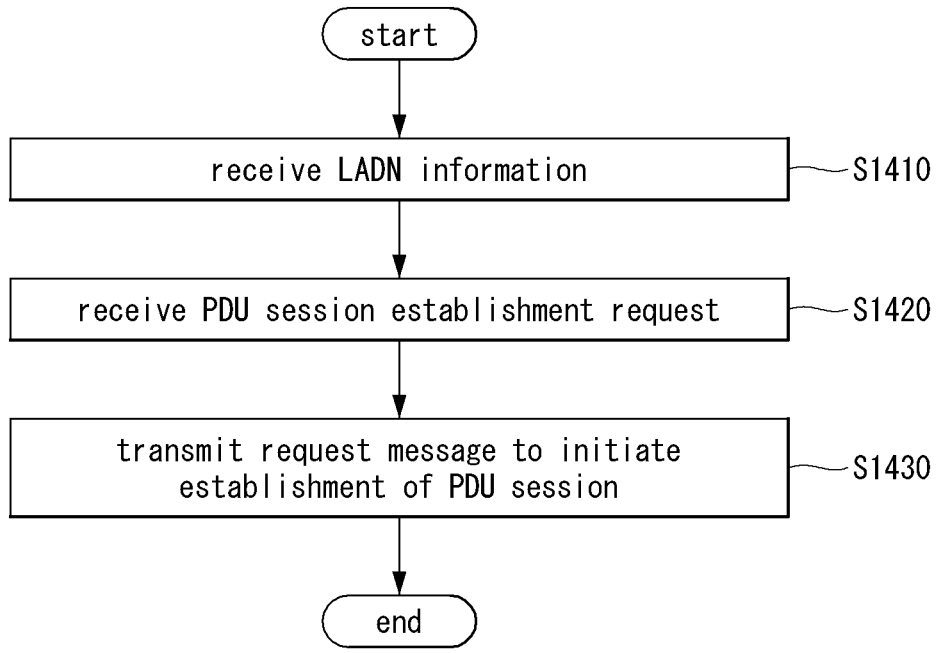
【Fig. 15】
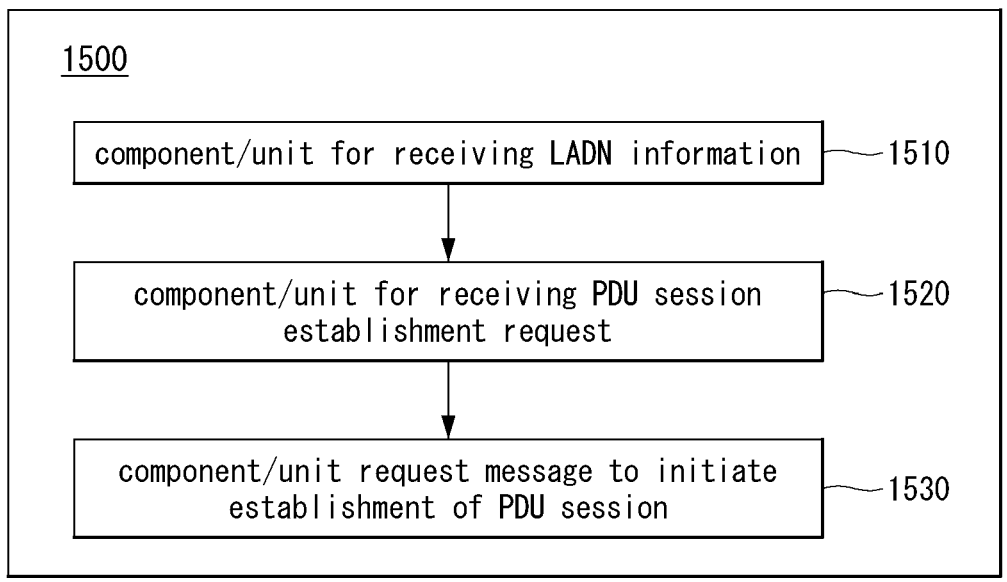

[Fig. 16]
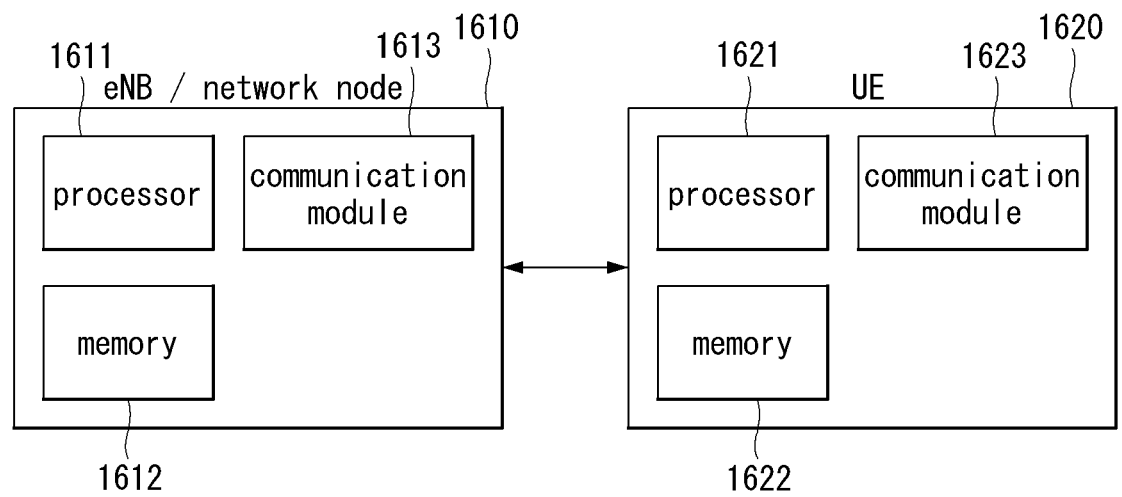
[Fig. 17]
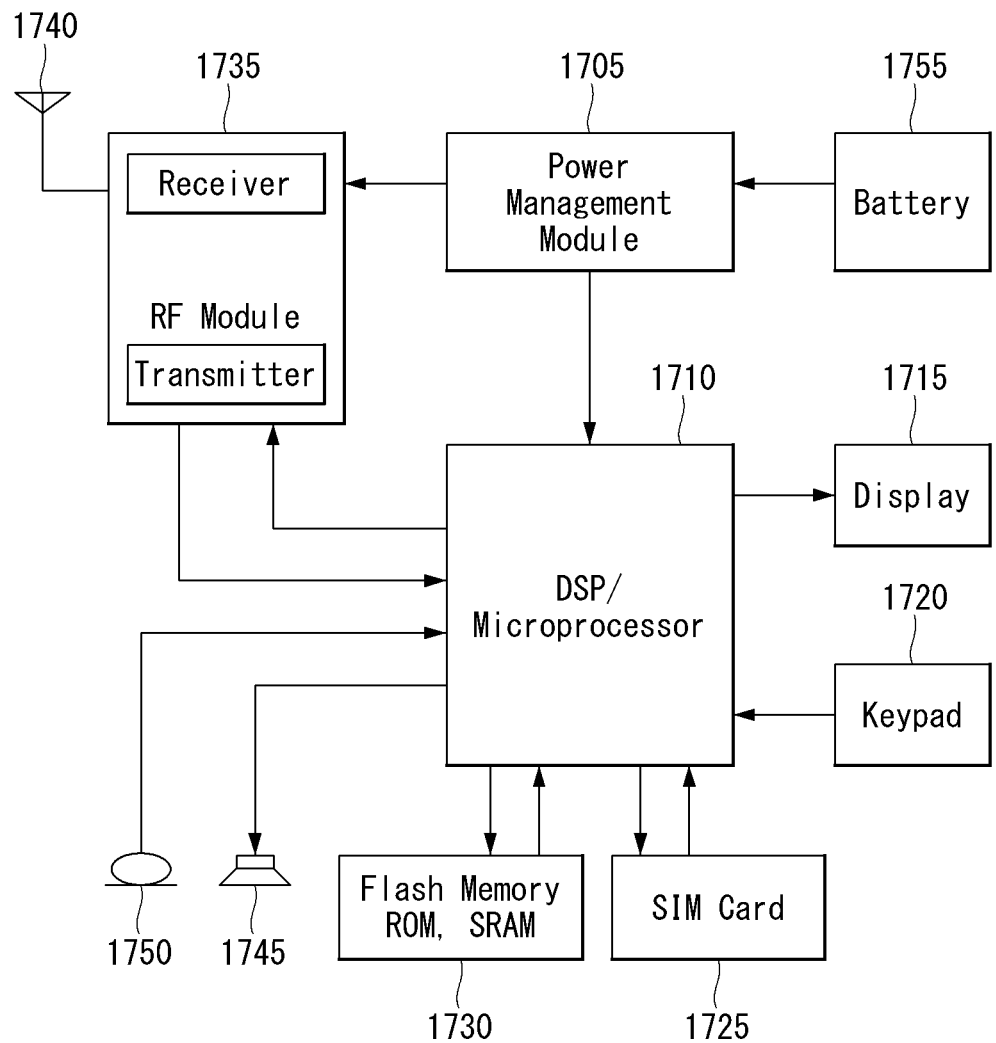

METHOD FOR SUPPORTING AND PROVIDING LADN SERVICE IN WIRELESS COMMUNICATION SYSTEM AND APPARATUS THEREFOR

This application is a 35 USC § 371 National Stage entry of International Application No. PCT/KR2018/013737, filed on Nov. 12, 2018, which claims priority to U.S. Provisional Application No. 62/586,183, filed on Nov. 15, 2017, and Korean Patent Application No. 10-2018-0054197, filed on May 11, 2018, all of which are incorporated by reference in their entirety herein.

TECHNICAL FIELD

The disclosure relates to a wireless communication system, and more specifically, to a method for supporting and providing LADN services and device for the same.

BACKGROUND ART

A mobile communication system has been developed to provide a voice service while ensuring an activity of a user. However, in the mobile communication system, not only a voice but also a data service is extended. At present, due to an explosive increase in traffic, there is a shortage of resources and users demand a higher speed service, and as a result, a more developed mobile communication system is required.

Requirements of a next-generation mobile communication system should be able to support acceptance of explosive data traffic, a dramatic increase in per-user data rate, acceptance of a significant increase in the number of connected devices, very low End-to-End Latency, and high-energy efficiency. To this end, various technologies have been researched, which include Dual Connectivity, Massive Multiple Input Multiple Output (Massive MIMO), In-band Full Duplex, Non-Orthogonal Multiple Access (NOMA), Super wideband support, Device Networking, and the like.

Particularly, recently, for a device that power consumption influences significantly on the lifetime of the device, various techniques for reducing power consumption have been vigorously researched.

DETAILED DESCRIPTION OF THE DISCLOSURE

Technical Problem

The disclosure aims to propose a method for efficiently supporting and providing an LADN services of a UE.

The disclosure also aims to propose a method for efficiently supporting and indicating establishment of an LADN PDU session for an LADN service of a UE.

According to the prior art, although an establishment of a PDU session for receiving an LADN service may be triggered/initiated/started from a UE, it may not be known specifically when the establishment of the PDU session of the UE occurs. That is, since the UE is not forced to establish a PDU session (and/or it is not clearly defined specifically when it needs to be initiated) even when the network is ready to provide an LADN service, the usability of the LADN service may be low.

There are proposed embodiments regarding methods and apparatuses for addressing the foregoing technical issues. Objects of the disclosure are not limited to the foregoing, and other unmentioned objects would be apparent to one of ordinary skill in the art from the following description.

Technical Solution

According to an embodiment of the disclosure, a method of supporting a local access data network (LADN) service of an access and mobility management function (AMF) in a wireless communication system may comprise providing LADN information for the LADN service to a user equipment (UE), the LADN information including LADN service area information and LADN data network name (DNN) information, obtaining location information about the UE, when a packet data unit (PDU) session for providing the LADN service is determined to be established based on the location information about the UE, transmitting a preset message including a request for establishing the PDU session to the UE, and receiving a request message for initiating to establish the PDU session from the UE.

The LADN information may be provided to the UE through a registration procedure or a UE configuration update procedure.

When the PDU session is determined to be established based on the location information about the UE may include when a location of the UE is inside an LADN service area included in the LADN service area information.

The PDU session may be determined to be established based on whether to allow the UE to access a data network (DN), whether to allow the UE to use an LADN service, and/or whether the UE roams in addition to the location information about the UE.

A network node that determines to establish the PDU session may be the AMF, a policy control function (PCF), a network exposure function (NEF), and/or a data network (DN)/application function (AF).

Transmitting the preset message may include receiving an application trigger request message to trigger the LADN service from the DN/AF and transferring the application trigger request message, as the preset message, to the UE.

Transmitting the preset message may include receiving an LADN PDU initiation message for requesting to initiate to establish the PDU session from the PCF and transmitting a paging message, as the preset message, to the UE.

Transmitting the preset message may include receiving an initiation message for requesting to initiate to establish the PDU session from the PCF, the initiation message including priority information related with establishing the PDU session and transmitting a non-access stratum (NAS) message, as the preset message, the NAS message including the priority information.

According to another embodiment, a method of receiving a local access data network (LADN) service by a UE in a wireless communication system may comprise receiving LADN information for the LADN service, the LADN information including LADN service area information and LADN data network name (DNN) information, when a packet data unit (PDU) session for providing the LADN service is determined to be established based on the location information about the UE, receiving a preset message including a request for establishing the PDU session from an access and mobility management function (AMF), and transmitting a request message for initiating to establish the PDU session to a network node.

When the PDU session is determined to be established based on the location information about the UE may include when a location of the UE is inside an LADN service area included in the LADN service area information.

A network node that determines to establish the PDU session may be the AMF, a policy control function (PCF), a network exposure function (NEF), and/or a data network (DN)/application function (AF).

Receiving the preset message may include receiving an application trigger request message for triggering the LADN service, as the preset message, from the DN/AF through the AMF.

Receiving the preset message may include receiving a paging message, as the preset message, from the AMF when the AMF receives an LADN PDU initiation message for requesting to initiate to establish the PDU session from the PCF.

Receiving the preset message may include, when the AMF receives an initiation message for requesting to initiate to establish the PDU session from the PCF, and the initiation message includes priority information related with establishing the PDU session, receiving a non-access stratum (NAS) message including the priority information, as the preset message, from the AMF.

According to another embodiment, A UE receiving a local access data network (LADN) service in a wireless communication system may comprise a communication module for transmitting/receiving a signal and a processor controlling the communication module, wherein the processor may receive LADN information for the LADN service, the LADN information including LADN service area information and LADN data network name (DNN) information, when a packet data unit (PDU) session for providing the LADN service is determined to be established based on the location information about the UE, receive a preset message including a request for establishing the PDU session from an access and mobility management function (AMF), and transmit a request message for initiating to establish the PDU session to a network node.

Advantageous Effects

According to an embodiment of the disclosure, since it becomes clear when a PDU session for receiving an LADN service is established, and a PDU session establishment command/indication is rendered possible directly by the network, the usability and flexibility of the LADN service may be increased.

Effects of the disclosure are not limited to the foregoing, and other unmentioned effects would be apparent to one of ordinary skill in the art from the following description.

BRIEF DESCRIPTION OF DRAWINGS

A more complete appreciation of the disclosure and many of the attendant aspects thereof will be readily obtained as the same becomes better understood by reference to the following detailed description when considered in connection with the accompanying drawings, wherein:

FIG. 1 is a view illustrating a 5G system architecture using a reference point expression;

FIG. 2 is a view illustrating an example radio protocol stack to which the disclosure is applicable;

FIG. 3 is a view illustrating an LADN deployment applicable to the disclosure;

FIG. 4 is a view illustrating a regular registration procedure according to an embodiment of the disclosure;

FIG. 5 is a view illustrating a preparation phase in a handover according to an embodiment of the disclosure;

FIG. 6 is a view illustrating an execution phase in an inter NG-RAN node N2-based handover according to an embodiment of the disclosure;

FIG. 7 is a view illustrating a method of providing LADN information according to an embodiment of the disclosure;

FIG. 8 is a view illustrating a method of operating an AMF to report whether a UE is located in an LADN service according to an embodiment of the disclosure;

FIG. 9 is a view illustrating an AMF operation method of determining whether a UE is located in an area of interest according to an embodiment of the disclosure;

FIG. 10 is a flowchart illustrating an LADN indication method for a UE according to an embodiment of the disclosure;

FIG. 11 is a view illustrating a method of identifying the location of a UE based on interoperations with an NEF/UDM according to an embodiment of the disclosure;

FIG. 12 is a flowchart illustrating an example method of supporting an LADN service by an AMF according to an embodiment of the disclosure;

FIG. 13 is a block diagram illustrating an AMF supporting an LADN service according to an embodiment of the disclosure;

FIG. 14 is a flowchart illustrating an LADN service reception method by a UE according to an embodiment of the disclosure;

FIG. 15 is a block diagram illustrating a UE receiving an LADN service according to an embodiment of the disclosure;

FIG. 16 is a block diagram illustrating a configuration of a communication device according to an embodiment of the disclosure; and FIG. 17 is a block diagram illustrating a configuration of a communication device according to an embodiment of the disclosure.

MODE FOR CARRYING OUT THE DISCLOSURE

In what follows, preferred embodiments according to the disclosure will be described in detail with reference to appended drawings. The detailed descriptions provided below together with appended drawings are intended only to explain illustrative embodiments of the disclosure, which should not be regarded as the sole embodiments of the disclosure. The detailed descriptions below include specific information to provide complete understanding of the disclosure. However, those skilled in the art will be able to comprehend that the disclosure can be embodied without the specific information.

For some cases, to avoid obscuring the technical principles of the disclosure, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by a upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the disclosure, and the specific terms can be used in different ways as long as it does not leave the technical scope of the disclosure.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the disclosure can be supported by standard documents disclosed in at least one of wireless access systems including the IEEE 802, 3GPP, and 3GPP2 specifications. In other words, among the embodiments of the disclosure, those steps or parts omitted for the purpose of clearly describing technical principles of the disclosure can be supported by the documents above. Also, all of the terms disclosed in this document can be explained with reference to the standard documents.

To clarify the descriptions, this document is based on the 3GPP LTE/LTE-A, but the technical features of the disclosure are not limited to the current descriptions.

Terms used in this document are defined as follows.

UMTS (Universal Mobile Telecommunications System): 3 Generation mobile communication technique based on Global System for Mobile Communication (GMS) developed by 3GPP.

EPS (Evolved Packet System): A network system including EPC (Evolved Packet Core) which is a packet switched core network based on IP (Internet Protocol) and an access network such as LTE, UTRAN, and the like.

NodeB: the base station of the UMTS network. NodeB is installed outside and provides coverage of a macro cell.

eNodeB: the base station of the EPS network. eNodeB is installed outside and provides coverage of a macro cell.

Home NodeB: It is installed indoors as a based station, and the coverage is a micro cell scale.

Home eNodeB: It is installed indoors as a base station of the EPS network, and the coverage is a micro cell scale.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

Machine Type Communication (MTC): communication performed by machines without human intervention. It may be called Machine-to-Machine (M2M) communication.

MTC terminal (MTC UE or MTC device or MRT apparatus): a terminal (e.g., a vending machine, meter, and so on) equipped with a communication function (e.g., communication with an MTC server through PLMN) operating through a mobile communication network and performing the MTC functions.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

Service Capability Exposure Function (SCEF): an entity in 3GPP architecture for the service capability exposure that provides a means for safely exposing a service and a capability provided by 3GPP network interface.

MME (Mobility Management Entity): A network node in an EPS network, which performs mobility management and session management functions PDN-GW (Packet Data Network Gateway): A network node in the EPS network, which performs UE IP address allocation, packet screening and filtering, and charging data collection functions.

Serving GW (Serving Gateway): A network node in the EPS network, which performs functions such as mobility anchor, packet routing, idle mode packet buffering, and triggering paging for the ME of MME Policy and Charging Rule Function (PCRF): A node in the EPS network, which performs policy decision to dynamically apply differentiated QoS and billing policies for each service flow PDN (Packet Data Network): A network in which a server supporting a specific service (e.g., MMS server, WAP server, etc.) is located.

PDN connection: A connection from the UE to the PDN, that is, the association (connection) between the UE represented by the IP address and the PDN represented by the APN.

In what follows, the disclosure will be described based on the terms defined above.

5G System Architecture to which the Disclosure May be Applied

A 5G system is a technology advanced from the 4th generation LTE mobile communication technology and a new radio access technology (RAT) through the evolution of the existing mobile communication network structure or a clean-state structure and an extended technology of long term evolution (LTE), and it supports extended LTE (eLTE), non-3GPP (e.g., WLAN) access and so on.

A 5G system is defined based on a service, and an interaction between network functions (NFs) within architecture for a 5G system may be expressed by two methods as follows.

Reference point representation (FIG. 1): indicates an interaction between NF services within NFs described by a point-to-point reference point (e.g., N11) between two NFs (e.g., AMF and SMF).

Service-based representation (FIG. 10): network functions (e.g., AMFs) within a control plane (CP) permit other authenticated network functions to access its own service. If this representation is necessary, it also includes a point-to-point reference point.

FIG. 1 is a diagram illustrating 5G system architecture using a reference point representation.

Referring to FIG. 1, the 5G system architecture may include various elements (i.e., a network function (NF)). This drawing illustrates an authentication server function (AUSF), a (core) access and mobility management function (AMF), a session management function (SMF), a policy control function (PCF), an application function (AF), united data management (UDM), a data network (DN), a user plane function (UPF), a (radio) access network ((R)AN) and a user equipment (UE) corresponding to some of the various elements.

Each of the NFs supports the following functions.

AUSF stores data for the authentication of a UE.

AMF provides a function for access of a UE unit and mobility management and may be basically connected to one AMF per one UE.

Specifically, the AMF supports functions, such as signaling between CN nodes for mobility between 3GPP access networks, the termination of a radio access network (RAN) CP interface (i.e., N2 interface), the termination (N1) of NAS signaling, NAS signaling security (NAS ciphering and integrity protection), AS security control, registration area management, connection management, idle mode UE reachability (including control and execution of paging retransmission), mobility management control (subscription and policy), intra-system mobility and inter-system mobility support, the support of network slicing, SMF selection, lawful interception (for an AMF event and an interface to an LI system), the provision of transfer of a session management (SM) message between a UE and an SMF, a transparent proxy for SM message routing, access authentication, access authorization including a roaming right check, the provision of transfer of an SMS message between a UE and an SMSF (SMS(Short Message Service) function), a security anchor function (SEA) and/or security context management (SCM).

Some or all of the functions of the AMF may be supported within a single instance of one AMF.

DN means an operator service, Internet access or a 3rd party service, for example. The DN transmits a downlink protocol data unit (PDU) to an UPF or receives a PDU, transmitted by a UE, from a UPF.

PCF provides a function for receiving information about a packet flow from an application server and determining a policy, such as mobility management and session management. Specifically, the PCF supports functions, such as the support of a unified policy framework for controlling a network behavior, the provision of a policy rule so that a CP function(s) (e.g., AMF or SMF) can execute a policy rule, and the implementation of a front end for accessing related subscription information in order to determine a policy within user data repository (UDR).

SMF provides a session management function and may be managed by a different SMF for each session if a UE has a plurality of sessions.

Specifically, the SMF supports functions, such as session management (e.g., session setup, modification and release including the maintenance of a tunnel between a UPF and an AN node), UE IP address allocation and management (optionally including authentication), the selection and control of the UP function, a traffic steering configuration for routing traffic from the UPF to a proper destination, the termination of an interface toward policy control functions, the execution of the control part of a policy and QoS, lawful interception (for an SM event and an interface to an LI system), the termination of the SM part of an NAS message, downlink data notification, the initiator of AN-specific SM information (transferred to an AN through N2 via the AMF), the determination of an SSC mode of a session, and a roaming function.

Some or all of the functions of the SMF may be supported within a single instance of one SMF.

UDM stores the subscription data of a user, policy data, etc. UDM includes two parts, that is, an application front end (FE) and user data repository (UDR).

The FE includes a UDM FE responsible for the processing of location management, subscription management and credential and a PCF responsible for policy control. The UDR stores data required for functions provided by the UDM-FE and a policy profile required by the PCF. Data stored within the UDR includes user subscription data, including a subscription ID, security credential, access and mobility-related subscription data and session-related subscription data, and policy data. The UDM-FE supports functions, such as access to subscription information stored in the UDR, authentication credential processing, user identification handling, access authentication, registration/mobility management, subscription management, and SMS management.

UPF transfers a downlink PDU, received from a DN, to a UE via an (R)AN and transfers an uplink PDU, received from a UE, to a DN via an (R)AN.

Specifically, the UPF supports functions, such as an anchor point for intra/inter RAT mobility, the external PDU session point of interconnection to a data network, packet routing and forwarding, a user plane part for the execution of packet inspection and a policy rule, lawful interception, a traffic usage report, an uplink classifier for supporting the routing of traffic flow of a data network, a branching point for supporting a multi-home PDU session, QoS handling (e.g., the execution of packet filtering, gating and an uplink/downlink rate) for a user plane, uplink traffic verification (SDF mapping between a service data flow (SDF) and a QoS flow), transport level packet marking within the uplink and downlink, downlink packet buffering, and a downlink data notification triggering function. Some or all of the functions of the UPF may be supported within a single instance of one UPF.

AF interoperates with a 3GPP core network in order to provide services (e.g., support functions, such as an application influence on traffic routing, network capability exposure access, an interaction with a policy framework for policy control).

(R)AN collectively refers to a new radio access network supporting all of evolved E-UTRA (E-UTRA) and new radio (NR) access technologies (e.g., gNB), that is, an advanced version of the 4G radio access technology.

The network node in charge of transmission/reception of wireless signals with the UE is the gNB, and plays the same role as the eNB.

The gNB supports functions for radio resource management (i.e., radio bearer control and radio admission control), connection mobility control, the dynamic allocation (i.e., scheduling) of resources to a UE in the uplink/downlink, Internet protocol (IP) header compression, the encryption and integrity protection of a user data stream, the selection of an AMF upon attachment of a UE if routing to the AMF has not been determined based on information provided to the UE, the selection of an AMF upon attachment of a UE, user plane data routing to an UPF(s), control plane information routing to an AMF, connection setup and release, the scheduling and transmission of a paging message (generated from an AMF), the scheduling and transmission of system broadcast information (generated from an AMF or operation and maintenance (O&M)), a measurement and measurement report configuration for mobility and scheduling, transport level packet marking in the uplink, session management, the support of network slicing, QoS flow management and mapping to a data radio bearer, the support of a UE that is an inactive mode, the distribution function of an NAS message, an NAS node selection function, radio access network sharing, dual connectivity, and tight interworking between an NR and an E-UTRA.

UE means a user device. A user apparatus may be called a term, such as a terminal, a mobile equipment (ME) or a mobile station (MS). Furthermore, the user apparatus may be a portable device, such as a notebook, a mobile phone, a personal digital assistant (PDA), a smartphone or a multimedia device, or may be a device that cannot be carried, such as a personal computer (PC) or a vehicle-mounted device.

In the drawings, for the clarity of description, an unstructured data storage network function (UDSF), a structured data storage network function (SDSF), a network exposure function (NEF) and an NF repository function (NRF) are not shown, but all of the NFs shown in this drawing may perform mutual operations along with the UDSF, NEF and NRF, if necessary.

NEF provides means for safely exposing services and capabilities provided by 3GPP network functions, for example, for a 3rd party, internal exposure/re-exposure, an application function, and edge computing. The NEF receives information from other network function(s) (based on the exposed capability(s) of other network function(s)). The NEF may store information received as structured data using a standardized interface as a data storage network function. The stored information is re-exposed to other network function(s) and application function(s) by the NEF and may be used for other purposes, such as analysis.

NRF supports a service discovery function. It receives an NF discovery request from an NF instance and provides information of a discovered NF instance to an NF instance. Furthermore, it maintains available NF instances and services supported by the available NF instances.

SDSF is an optional function for supporting a function of storing and retrieving information as structured data by any NEF.

UDSF is an optional function for supporting a function of storing and retrieving information as unstructured data by any NF.

In the 5G system, a node which is responsible for wireless transmission/reception with the UE is gNB and plays the same role as the eNB in the EPS. When the UE is simultaneously connected to the 3GPP connection and the non-3GPP connection, the UE receives a service through one AMF as illustrated in FIG. 1. In FIG. 1, it is illustrated that a connection is made by the non-3GPP connection and a connection is made by the 3GPP connection are connected to one same UPF, but the connection is not particularly required and may be connected by a plurality of different UPFs.

However, when the UE selects N3IWK (also referred to as non-3GPP interworking function (N3IWF)) in the HPLMN in the roaming scenario and is connected to the non-3GPP connection, the AMF that manages the 3GPP connection may be located in the VPLMN and the AMF that manages the non-3GPP connection may be located in the HPLMN.

The non-3GPP access network is connected to the 5G core network via N3IWK/N3IWF. The N3IWK/N3IWF interfaces the 5G core network control plane function and user plane function via the N2 and N3 interfaces, respectively.

A representative example of the non-3GPP connection mentioned in the present specification may be a WLAN connection.

Meanwhile, this drawing illustrates a reference model if a UE accesses one DN using one PDU session, for convenience of description, but the disclosure is not limited thereto.

A UE may access two (i.e., local and central) data networks at the same time using multiple PDU sessions. In this case, for different PDU sessions, two SMFs may be selected. In this case, each SMF may have the ability to control both a local UPF and central UPF within a PDU session, which can be independently activated per PDU.

Furthermore, a UE may access two (i.e., local and central) data networks provided within one PDU session at the same time.

In the 3GPP system, a conceptual link that connects NFs within the 5G system is defined as a reference point. The following illustrates reference points included in 5G system architecture represented in this drawing.

N1: a reference point between a UE and an AMF
N2: a reference point between an (R)AN and an AMF
N3: a reference point between an (R)AN and a UPF
N4: a reference point between an SMF and a UPF
N5: a reference point between a PCF and an AF
N6: a reference point between a UPF and a data network
N7: a reference point between an SMF and a PCF
N24: a reference point between a PCF within a visited network and a PCF within a home network
N8: a reference point between a UDM and an AMF
N9: a reference point between two core UPFs
N10: a reference point between a UDM and an SMF
N11: a reference point between an AMF and an SMF N12: a reference point between an AMF and an AUSF
N13: a reference point between a UDM and an authentication server function (AUSF)
N14: a reference point between two AMFs
N15: a reference point between a PCF and an AMF in the case of a non-roaming scenario and a reference point between a PCF within a visited network and an AMF in the case of a roaming scenario
N16: a reference point between two SMFs (in the case of a roaming scenario, a reference point between an SMF within a visited network and an SMF within a home network)
N17: a reference point between an AMF and an EIR
N18: a reference point between any NF and an UDSF
N19: a reference point between an NEF and an SDSF Radio Protocol Architecture FIG. 2 is a diagram illustrating a radio protocol stack to which the disclosure may be applied. Specifically, FIG. 2(a) illustrates a radio interface user plane protocol stack between a UE and a gNB, and FIG. 2(b) illustrates a radio interface control plane protocol stack between the UE and the gNB.

A control plane means a passage through which control messages are transmitted in order for a UE and a network to manage a call. A user plane means a passage through which data generated in an application layer, for example, voice data or Internet packet data is transmitted.

Referring to FIG. 2(a), the user plane protocol stack may be divided into a first layer (Layer 1) (i.e., a physical layer (PHY) layer) and a second layer (Layer 2).

Referring to FIG. 2(b), the control plane protocol stack may be divided into a first layer (i.e., a PHY layer), a second layer, a third layer (i.e., a radio resource control (RRC) layer) and a non-access stratum (NAS) layer.

The second layer is divided into a medium access control (MAC) sublayer, a radio link control (RLC) sublayer, a packet data convergence protocol (PDC) sublayer, and a service data adaptation protocol (SDAP) sublayer (in the case of a user plane).

Radio bearers are classified into two groups: a data radio bearer (DRB) for user plane data and a signaling radio bearer (SRB) for control plane data Hereinafter, the layers of the control plane and user plane of the radio protocol are described.

1) The PHY layer, that is, the first layer, provides information transfer service to a higher layer using a physical channel. The PHY layer is connected to the MAC sublayer located in a high level through a transport channel Data is transmitted between the MAC sublayer and the PHY layer through a transport channel. The transport channel is classified depending on how data is transmitted according to which characteristics through a radio interface. Furthermore, data is transmitted between different physical layers, that is, between the PHY layer of a transmission stage and the PHY layer of a reception stage through a physical channel.

2) The MAC sublayer performs mapping between a logical channel and a transport channel; the multiplexing/demultiplexing of an MAC service data unit (SDU) belonging to one logical channel or different logical channels to/from a transport block (TB) transferred to/from the PHY layer through a transport channel; a scheduling information report; error correction through a hybrid automatic repeat request (HARQ); priority handling between UEs using dynamic scheduling; priority handling between the logical channels of one UE using logical channel priority; and padding.

Different types of data transfer service provided by the MAC sublayer. Each logical channel type defines that information of which type is transferred.

Logical channels are classified into two groups: a control channel and a traffic channel.

i) The control channel is used to transfer only control plane information and is as follows.
Broadcast control channel (BCCH): a downlink channel system for broadcasting control information.
Paging control channel (PCCH): a downlink channel transferring paging information and system information change notification.
Common control channel (CCCH): a channel for transmitting control information between a UE and a network. This channel is used for UEs not having an RRC connection with a network.
Dedicated control channel (DCCH): a point-to-point bidirectional channel for transmitting dedicated control information between a UE and a network. It is used by a UE having an RRC connection.

ii) The traffic channel is used to use only user plane information:
Dedicated traffic channel (DTCH): a point-to-point channel for transferring user information and dedicated to a single UE. The DTCH may be present in both the uplink and downlink.

In the downlink, a connection between a logical channel and a transport channel is as follows.

A BCCH may be mapped to a BCH. A BCCH may be mapped to a DL-SCH. A PCCH may be mapped to a PCH. A CCCH may be mapped to a DL-SCH. A DCCH may be mapped to a DL-SCH. A DTCH may be mapped to a DL-SCH.

In the uplink, a connection between a logical channel and a transport channel is as follows. A CCCH may be mapped to an UL-SCH. A DCCH may be mapped to an UL-SCH. A DTCH may be mapped to an UL-SCH.

3) The RLC sublayer supports three transport modes: a transparent mode (TM), an unacknowledged mode (UM) and acknowledged mode (AM).

An RLC configuration may be applied to each logical channel. In the case of an SRB, the TM or AM mode is used. In contrast, in the case of a DRB, the UM or AM mode is used.

The RLC sublayer performs the transfer a higher layer PDU; independent sequence numbering with a PDCP; error correction through an automatic repeat request (ARW); segmentation and re-segmentation; the reassembly of an SDU; RLC SDU discard; and RLC re-establishment.

4) The PDCP sublayer for a user plane performs sequence numbering; header compression and compression-decompression (corresponding to only robust header compression (RoHC)); user data transfer; reordering and duplicate detection (if there is transfer to a layer higher than the PDCP); PDCP PDU routing (in the case of a split bearer); the retransmission of a PDCP SDU; ciphering and deciphering; PDCP SDU discard; PDCP re-establishment and data recovery for RLC AM; and the duplication of a PDCP PDU.

The PDCP sublayer a control plane additionally performs sequence numbering; ciphering, deciphering and integrity protection; control plane data transfer; duplication detection; the duplication of a PDCP PDU.

When duplication for a radio bearer is configured by RRC, an additional RLC entity and an additional logical channel are added to a radio bearer in order to control a duplicated PDCP PDU(s). In the PDCP, duplication includes transmitting the same PDCP PDU(s) twice. The first one is transferred to the original RLC entity, and the second one is transferred to an additional RLC entity. In this case, the duplication corresponding to the original PDCP PDU is not transmitted to the same transport block. Different two logical channels may belong to the same MAC entity (in the case of a CA) or to different MAC entities (in the case of DC). In the former case, a logical channel mapping restriction is used to guarantee that a duplication corresponding to the original PDCP PDU is not transferred to the same transport block.

5) The SDAP sublayer performs i) mapping between a QoS flow and a data radio bearer and ii) QoS flow ID marking within a downlink and uplink packet.

One protocol entity of an SDAP is configured for each PDU session, but exceptionally in the case of dual connectivity (DC), two SDAP entities may be configured.

6) The RRC sublayer performs the broadcasting of system information related to an access stratum (AS) and a non-access stratum (NAS); paging initiated by 5GC or an NG-RAN; the establishment, maintenance and release (additionally including the modification and release of a carrier aggregation and additionally including the modification and release of dual connectivity between an E-UTRAN and an NR or within an NR) of an RRC connection between a UE and an NG-RAN; a security function including key management; the establishment, configuration, maintenance and release of an SRB(s) and a DRB(s); handover and context transfer; control of UE cell selection, re-release and cell selection/reselection; a mobility function including mobility between RATs; a QoS management function, a UE measurement report and report control; the detection of a radio link failure and recovery from a radio link failure; and the transfer of an NAS message from an NAS to a UE and the transfer of an NAS message from a UE to an NAS.

PDU Session Management Method

In the case where the UE enters an area where it may access a local access data network (LADN), the AMF may give LADN information to the UE and, based thereupon, the UE may create a PDU session to the LADN. The LADN information in the AMF is information stored by the network configuration. Upon giving the LADN area information, the AMF may provide the UE with only information for an overlapping area of the LADN area and registration area assigned to the UE, rather than the whole LADN area information. For example, if the LADN areas are tracking area 2 (TA2), TA3, TA4, and TA5, and the AMF assigns TA1, TA2, TA3, or TA4, as registration area, to the UE, TA2, TA3, and TA4, as LADN area information to the UE, are transferred, but TA5 is not. According to the current standards, it is not clear whether the AMF is aware of the whole LADN area information or only the LADN area information for the area managed by the AMF of the LADN areas, as information for the LADN area.

FIG. 3 is a view illustrating an LADN deployment applicable to the disclosure.

Referring to FIG. 3, it is unclear whether when the network configures TA1, TA2, TA3, and TA4 as LADN areas, it is not clear whether the AMF is aware of only TA1 and TA2 or TA3 and TA4 as LADN areas according to the current standards.

According to the current standards, when the UE enters or exits the LADN area, the AMF sends an indication as to whether the UE has entered or exited the LADN area to the SMF. In the example of FIG. 3, when the UE moves only in the AMF1 area, AMF1 may be aware whether the UE departs off the LADN areas TA1 and TA2 and notify the SMF of the same. However, when escaping from the AMF1 area to other AMF area, if the AMF is unaware of all the information for the LADN areas, it may be not aware whether it has escaped from, or stays in, the LADN area in where it has indeed moved to. Although the AMF has information for all the LADN areas, if moving over to other area by the idle mode mobility, the AMF may not be aware of it. In the case where a TA is allocated per cell in connected mode, the AMF may be unaware of the precise target cell information in the handover process and does not precisely know whether it departs off the LADN area. The disclosure proposes methods for addressing such issues.

If an LADN PDU session is created, the SMF may set a service for notifying the AMF when the UE enters or exists the LADN area. The SMF requests this service while the PDU session is created. The AMF receives the request and creates a UE context or service context (e.g., the last sent indication) of storing the information last sent from the AMF to the SMF. Where the AMF notifies the SMF that the UE exits the LADN area, the AMF sets the last sent indication to "moved out" and, when notifying the SMF of entering the LADN area, sets the last sent indication to "moved in." Where the service is first generated, since it is generated when the UE is in the LADN area, the last sent indication is set to "moved in." When the AMF is changed, such information is transmitted, as part of the UE context, to the new AMF (or as part of the service context) and, upon determining that it has entered or exited the LADN area, notifies the SMF of the same based on the last sent indication.

For example, when the last transmission indication received by the new AMF is "moved in" and the UE stays in the LADN area, no indication is sent to the SMF and, if the UE is not in the LADN area, an indication is sent to the SMF, with the last sent indication switched to "moved out."

Since the UE may have a plurality of LADN PDU sessions, it needs to have the last sent indication for each of the LADN data network names (DNN) of LADN PDU sessions that the UE has.

The disclosure may commonly be applied where a location reporting service is used in a regular PDU session, but not only in a PDU session for LADN. For example, the SMF may notify of the area of interest to grasp an exit from the UPF service area while creating a PDU session and receive a location report and, even in such a case, the same issue may arise as the AMF changes, but this may be addressed by what is proposed below in the disclosure.

The last sent indication may be stored in the form of indicating whether the UE is in the LADN area. For example, where the last sent indication is "moved in," it means that the UE is in the LADN and, where "moved out," this means that the UE is out of the LADN. Thus, the status of the UE may be stored in the form of, e.g., "in" or "out."

According to the prior art, if the UE enters idle mode, out of the LADN area, with there an LADN PDU session existing, an indication of the switch to the idle mode is supposed to be sent to the SMF. Since in idle mode the precise location of the UE is unable to be grasped, and thus, it is not known whether the UE is in or out of the LADN area, such operation is performed to send a paging to the UE when downlink data occurs. Upon performing such operation, the AMF may set the last sent indication to "moved in." When the UE is in idle mode, the same operation as if the UE is in the LADN area is performed in view of the SMF. Thus, it is not needed to additionally send a "moved in" indication.

In the case of the LADN, the SMF provides the AMF with the LADN DNN only for subscribing to notification when the UE enters the LADN service area. Upon detecting an entrance and exit of the UE to/from an area where the LADN may be used, the AMF notifies the SMF of the same. Upon receiving, from the AMF, the notification that the UE has entered or exited the LADN area, the SMF determines how to handle the PDU session (e.g., releasing the PDU session or deactivating the user plane connection for the PDU session). The AMF may send the location of the UE, along with the notification (for UPF redeployment), to the SMF.

The AMF notifies the SMF of the "moved in" or "moved out" event. To detect the "moved in" or "moved out" state, the AMF needs to have the last sent LADN state (e.g., inside LADN area or outside LADN area).

Observation 1: To report the "moved in" or "moved out" event, the AMF needs to have the last sent LADN state (e.g., inside LADN area or outside LADN area).

Proposal 1: In the case where the AMF has subscribed to report the LADN area, it is proposed to clarify for the AMF to store the last sent LADN state (e.g., inside LADN area or outside LADN area).

TS 23.502 clause 4.2.2.2.2 (registration procedure) sets forth the following sentence:

4. [Conditional] From new AMF to old AMF: Namf_Communication_UEContextTransfer (complete registration request).

Where the UE's 5G-GUTI (Globally Unique Temporary Identity) is included in the registration request, and the serving AMF is changed after the last registration procedure, the new AMF may invoke the Namf_Communication_UEContextTransfer service operation for the old AMF, including the complete registration request IE (information element) which may be protected for integrity to request the UE's SUPI (Subscription Permanent Identifier) and MM context. Refer to Ch. 5.2.2.2.2 for details of this service operation. The old AMF uses the integrity-protected complete registration request element IE to verify whether the context transmission service operation invocation corresponds to the requested UE.

The old AMF transfers event subscription information by each consumer NF for the UE to the new AMF.

Note 1: The consumer NF need not register once again the event to the new AMF after the UE is successfully registered in the new AMF.

If the new AMF has already received the UE context from the old AMF during the handover procedure, steps 4, 5, and 10 may be skipped.

Since event subscription is transmitted between the old AMF and the new AMF, the consumer NF need not subscribe to the event again. However, it is not clear which AMF (e.g., the old or new AMF) notifies the SMF of the location reporting event.

Observation 2: If the AMF is changed, it is not clear which AMF (e.g., the old AMF or new AMF) notifies of the location reporting event.

If the AMF is changed, the old AMF may lack sufficient information for the UE location. For example, if the UE is in CM-IDLE state and exits the registered area, the UE performs a registration procedure. Then, the new AMF is aware of the precise UE location, but the old AMF does not. Thus, in the disclosure, it is proposed for the new AMF to notify the SMF of the enrolled event.

Proposal 2: If the AMF switches, the new AMF notifies of the location reporting event.

LADN location reporting is performed when the AMF detects the "moved in" or "moved out" state. To detect a condition, the new AMF needs to know the last LADN UE state (e.g., inside LADN area or outside LADN area). Thus, it is proposed in the disclosure that the last LADN UE state, along with the event subscription, is transmitted to the new AMF.

Proposal 3: The last sent LADN state (e.g., the inside LADN area or outside LADN area) is transferred between the old AMF and the new AMF.

As per TS 23.501 Ch. 5.6.5, the AMF is configured with LADN information as follows:

LADN information is configured in each DN unit by the AMF, and the configured LADN service area is identical regardless of other elements (e.g., the UE's registration area).

When the AMF provides LADN service area information, the AMF provides a tracking area set that belongs to the current registration areas (i.e., the intersection of the LADN service area and the current registration area).

However, it is unclear whether the AMF is aware of the whole LADN service area belonging to the AMF service area or part of the LADN service area (i.e., the intersection between the LADN service area and the AMF service area).

Observation 3: It is unclear whether the AMF is aware of the whole LADN service area or part of the LADN service area belonging to the AMF service area.

As per proposals 2 and 3, the AMF need not know the whole LADN service area. Thus, it is proposed in the disclosure to ensure that the AMF need not know the whole LADN service area.

Proposal 4: It is proposed to ensure that the AMF need not know the whole LADN service area.

Access to the DN via a PDU session for the LADN is available only in a specific LADN service area. The LADN service area is a set of tracking areas. 5GC needs to support the UE to be able to recognize the availability of the LADN based on the UE location.

In the case of the LADN, the AMF provides LADN information regarding the availability of LADN to the UE, and the AMF tracks whether the UE is in the LADN service area (i.e., the area where the LADN is available) and notifies the SMF of the same.

The LADN service area configured by the AMF should not be the whole LADN service area but may be limited to a service area of the AMF.

The LADN information provided by the AMF to the UE includes LADN DNN and LADN service area information availability. The LADN service area information provided to the UE during the registration procedure includes a set of tracking areas belonging to the UE's current registration area (i.e., the intersection between the LADN service area and the current registration area). The AMF creates no registration area according to the LADN availability.

Remark 1: Since the LADN service area may include a TA(s) outside the UE's registration area, the LADN service area information sent by the AMF to the UE may only include a subset of the full LADN service area.

When the UE performs a successful (re)registration procedure, the AMF may provide the RA with the LADN information for the LADN that the UE may use, in a registration authorization message based on LADN information, UE location, UE subscription information received from the UDM for the DNN subscribed to as the LADN, or local configuration information (e.g., via the OAM (Orbital Angular Momentum)) regarding the policies provided by the PCF. If the network does not provide the LADN information during a subsequent registration update procedure except for the periodic registration update procedure, the UE deletes out the LADN information.

If the LADN information for the UE in the 5GC is changed, the AMF may update the LADN information to the UE via a UE configuration update procedure set forth in TS 23.502 [3] Ch. 4.2.4.

Based on the LADN information in the UE, the UE may request to establish PDU session for the LADN available when the UE is located in the LADN service area. When the UE is outside the LADN service area, the UE should not request a PDU session for LADN, and the SMF should reject such a request. When the UE is out of the LADN service area, a service request for LADN PDU session UP (User Plane) connection activation, UE initiated PDU session establishment/modification, and LADN PDU session UP connection activation should not be triggered, and the SMF should reject the establishment/modification for the LADN PDU session and UP connection activation.

The SMF subscribes to the "UE location change notification" as set forth in Ch. 5.6.11. The SMF may make the following decisions based on the notification as to whether the UE enters and exits an LADN-available area, as received from the AMF:

Whether a network trigger service request needs to be triggered as to the user plane connection inactivated LADN PDU session.

Release PDU session, or

Deactivate user plane connection for PDU session and maintain PDU session. The network may release the PDU session later anytime according to the network policies. The SMF may request the UPF to discard the downlink data for the PDU session or not to send a data notification message to the SMF.

This decision may be affected by the local policies.

In the network deployment where the UE may enter or exit the LADN service area without notification to the 5GC in CM-CONNECTED state, the AMF needs to start location reporting and track the UE's precise location related to the LADN service area in CM-CONNECTED state as set forth in 5.6.11.

When leaving the LADN service area, the UE need not release the LADN PDU session unless it receives an explicit PDU session release request from the network.

Where the SMF is aware that the UE is out of the LADN-available area, the SMF should not trigger user plane connection activation for the PDU session corresponding to the LADN.

Upon detecting an entrance of the UE into the LADN service area, the AMF notifies the SMF based on the SMF subscription to the area of interest corresponding to the LADN. Where the SMF or UPF has DL data put on hold, the SMF performs a network trigger service request to activate the UP connection for the PDU session. Otherwise, the SMF need prompt the UPF to retransmit a DL data notification to, in the case of DL data, the SMF.

If NAS signaling connection is released, after receiving an N2 UE context release complete for the PDU session corresponding to the LADN, the AMF notifies the SMF of the LADN event ("moved in" or "moved out") along with an NAS signaling connection release indication and, if the SMF has previously notified the UPF to discard the downlink data for PDU sessions and/or to provide no additional downlink data notification message, resume the downlink data notification. If NAS signaling connection is established, the AMF notifies the SMF of the LADN event ("moved in" or "moved out") along with an NAS signaling connection establish indication, and the SMF may request the UPF to discard downlink data for the PDU session and/or sends no data notification message to the SMF.

In the instant embodiment, the LADN may be applied only to 3GPP access.

When a PDU session is established or modified, or the user plane path is changed (e.g., UPF reallocation), the SMF may determine an area of interest (e.g., based on the UPF service area) and subscribe to the AMF notification. When the AMF detects an entrance or exit of the UE, the AMF needs to notify the SMF of the new location of the UE.

In the case of 3GPP access, the area of interest is defined by a tracking area list.

The SMF subscribes to the "UE mobility event notification" service provided by the AMF. While subscribing, the SMF provides the area of interest to the AMF. Upon detecting an entrance/exit of the UE to/from the area, the AMF transmits the new location of the UE to the SMF. Upon receiving the new UE location from the AMF, the SMF determines how to handle the PDU session (e.g., relocation of UPF).

Where the AMF has been enrolled in the area of interest by the SMF and the area of interest is smaller than the registered area transmitted to the UE, the AMF may provide the area of interest to the NG-RAN via a designated location reporting procedure (TS 23.502 [3]). When the NG-RAN detects an entrance or exit of the UE to/from the area of interest provided by the AMF, the NG-RAN notifies the AMF of the latest UE location.

In the case of the LADN, the SMF provides the AMF with the LADN DNN only for subscribing to notification when the UE enters the LADN service area. Upon detecting an entrance and exit of the UE to/from an area where the LADN may be used, the AMF notifies the SMF of the same. The AMF stores the last notified LADN state (e.g., "inside LADN area" or "outside LADN area") which is transmitted between AMFs along with service subscription. Upon receiving, from the AMF, the notification that the UE has entered or exited the LADN area, the SMF determines how to handle the PDU session (e.g., releasing the PDU session or deactivating the user plane connection for the PDU session). The AMF may send the UE location along with the notification to the SMF (e.g., for UPF relocation).

The subscription (or subscription information) may be maintained during the lifetime of the PDU session regardless of the UP activation state (e.g., PDU session UP connection activation or deactivation) of the PDU session.

The SMF determines a new area of interest and sends a new subscription to the AMF with the area of interest.

When the PDU session is released, the SMF cancels the subscription to the "UE mobility event notification" service.

The UE location change notification may be subscribed to by other NF.

The AMF notifies the SMF of the "moved in" or "moved out" event. To detect the "moved in" or "moved out" state, the AMF needs to have the last sent LADN state (e.g., inside LADN area or outside LADN area).

FIG. 4 is a view illustrating a regular registration procedure according to an embodiment of the disclosure.

1. From UE to (R)AN: AN message (AN parameter, RM-NAS registration request (registration type, SUPI or 5G-GUTI, last visited TAI (tracking area identifier) (if available), security parameter, requested NSSAI, UE 5GC function, PDU session status, PDU session to be reactivated, follow on request, MICO (mobile initiated connection only) mode preference).

In the case of NG-RAN, the AN parameter includes, e.g., SUPI or 5G-GUTI, selected PLMN ID and requested NSSAI, and the AN parameter also includes the cause of establishment. The cause of establishment provides the cause of requesting to establish RRC connection.

The registration type may indicate whether the UE desires to perform "initial registration (i.e., the UE is in the RM-DEREGISTERED state)," "mobility registration update (i.e., the UE is in the RM_REGISTERED state and initiates the registration procedure due to mobility)," or "periodic registration update (i.e., the UE is in the RM-REGISTERED state and initiates the registration procedure due to expiration of the periodic update timer)." Upon performing initial registration (i.e., the UE is in the RM-DEREGISTERED state) for the PLMN still lacking 5G-GUTI, the UE needs to include the SUPI in the registration request. In other cases, the 5G-GUTI is included and indicates the last serving AMF. Where the UE has already been registered, via non-3GPP access, in a new PLMN (i.e., which is not the registered PLMN or equivalent PLMN to the registered PLMN) of 3GPP access and other PLMN, the UE and the 5G-GUTI are assigned by the AMF via 3GPP access for the UE and non-3GPP access for the 5G-GUTI during the registration procedure. Where the UE has been already registered, via 3GPP access, in a new PLMN (i.e., which is not the registered PLMN or equivalent PLMN to the registered PLMN) of non-3GPP access and other PLMN (i.e., registered PLMN), the UE is required not to provide, via non-3GPP access, the 5G-GUTI assigned by the AMF during the registration procedure via 3GPP access. The UE may provide the use configuration of the UE based on its configuration as defined in TS 23.501 [2] 5.16.3.7.

If possible, the last visited TAI needs to be included for the AMF to assist in generating a registration area for the UE.

The security parameter is used for authentication and integrity protection. The requested NSSAI indicates network slice selection support information (as defined in TS 23.501 [2] Ch. 5.15). The PDU session status indicates the PDU session previously established in the UE. The PDU session(s) to be reactivated are included to indicate the PDU session(s) where the UE is to activate UP connection. The PDU session corresponding to the LADN should not be included in the PDU session to be reactivated when the UE is out of the LADN available area. The follow on request is included when the UE has uplink signaling put on hold and the UE lacks the PDU session to be reactivated.

2. Where the SUPI is included or the 5G-GUTI does not indicate a valid AMF, the AMF is selected according to the (R)AT and requested NSSAI (if available).

The (R)AN selects an AMF as described in TS 23.501 [2] Ch. 6.3.5.

Where the (R)AN cannot select a proper AMF, a registration request is transmitted to the AMF configured in the (R)AN, so that AMF selection is performed.

3. From (R)AN to new AMF: N2 message (N2 parameter, RM-NAS registration request (registration type, SUPI or 5G-GUTI, last visited TAI (tracking area identifier) (if available), security parameter, requested NSSAI, UE 5GC function, PDU session status, PDU session to be reactivated, follow on request, MICO mode preference).

When an NG-RAN is used, the N2 parameter includes selected PLMN ID related to the cell where the UE is camping, location information, cell identifier, and RAT type.

When the NG-RAN is used, the N2 parameter also includes the cause of establishment.

If the registration type indicated by the UE is periodic registration update, steps 4 to 17 may be omitted.

4. [Conditional] From new AMF to old AMF: Namf_Communication_UEContextTransfer (complete registration request).

Where the UE's 5G-GUTI is included in the registration request, and the serving AMF is changed after the last registration procedure, the new AMF may invoke the Namf_Communication_UEContextTransfer service operation for the old AMF, including the complete registration request IE which may be protected for integrity to request the UE's SUPI and MM context. Refer to Ch. 5.2.2.2.2 for details of this service operation. The old AMF uses the integrity-protected complete registration request element IE to verify whether the context transmission service operation invocation corresponds to the requested UE.

If the new AMF has already received the UE context from the old AMF during the handover procedure, steps 4, 5, and 10 may be skipped.

5. [Conditional] From old AMF to new AMF: Response to Namf_Communication_UEContextTransfer (SUPI, UE context, SMF information, PCF ID, event subscription).

The old AMF includes the UE's SUPI and UE/MM context, thereby responding to the new AMF for Namf_Communication_UEContextTransfer invocation.

The event subscription includes the subscribed service operation with the related context.

If the old AMF has information related to established PDU sessions, the old AMF includes the SMF information including the S-NSSAI, SMF identifier, and PDU session ID.

If the old AMF has information related to active NGAP (NG application protocol) UE-TNLA binding for N3IWF, the old AMF includes information regarding NGAP UE-TNLA binding.

The consumer NF need not register once again the event to the new AMF after the UE is successfully registered in the new AMF.

6. [Conditional] From new AMF to UE: Identification request ( ).

If no SUPI is provided by the UE or is retrieved from the old AMF, an identification request procedure is initiated as the AMF transmits an identification request message to the UE.

7. [Conditional] From UE to new AMF: Identification response ( ).

The UE responds by an identification response message containing the SUPI.

8. The AMF may determine to start UE authentication by invoking the AUSF. In this case, the AMF needs to select the AUSF specified in TS 23.501 [2] Ch. 6.3.4 based on the SUPI.

9a. The AUSF needs to execute UE authentication.

The authentication is performed as defined in the standard and needs the UDM. The AUSF discovers the UDM as described in TS 23.501 [2] Ch. 6.3.8.

Where network slicing is used, the AMF determines whether to need to re-route a registration request as described in Ch. 4.2.2.2.3 where the initial AMF references the AMF.

9b. The AMF needs to initiate the NAS security function.

The NAS security may be performed as defined in the standard.

10. [Conditional] From new AMF to old AMF: Namf_Communication_RegistrationCompleteNotify ( ).

Where the AMF is changed, the new AMF notifies the old AMF that UE registration has been complete by invoking the Namf_Communication_RegistrationCompleteNotify service operation.

If the authentication/security procedure fails, registration is rejected, and the new AMF invokes the Namf_Communication_RegistrationCompleteNotify service operation along with the code of rejection indication cause for the old AMF. The old AMF continues as if the UE context transmission service operation has not been received.

Where one or more S-NSSAIs used in the prior registration area may not be served in the target registration area, the new AMF determines the PDU session that may not be supported in the new registration area. The new AMF invokes the Namf_Communication_RegistrationCompleteNotify service operation for the old AMF, which includes the rejected PDU session ID and cause of rejection (e.g., when the S-NSSAI is no longer available). Then, the new AMF modifies the PDU session status accordingly. The old AMF notifies the SMF that it will invoke the Nsmf_PDUSession_ReleaseSMContext service task and locally releases the UE's SM context.

The details of the Namf_Communication_RegistrationCompleteNotify service operation are set forth in Ch. 5.2.2.2.3.

11. [Conditional] From new AMF to UE: Identification request/response (PEI (Permanent Equipment Identifier)).

If no PEI is provided by the UE or is retrieved from the old AMF, an identification request procedure is initiated as the AMF sends an identification request message for retrieving the PEI to the UE.

12. Selectively, the new AMF invokes the N5geir_MEquipmentIdentityCheck_Get service operation (refer to Ch. 5.2.4.2.2) and starts to verify ME identification.

PEI identification is performed as described in Chapter 4.7.

If step 14 is performed, the new AMF selects the UDM based on the SUPI.

The AMF selects the UDM as described in TS 23.501 [2] Ch. 6.3.8.

14a-b. Where, after the last registration procedure, the AMF is changed, the UE provides the SUPI that does not reference a valid context in the AMF, or the UE is registered in the same AMF and already registered in non-3GPP access (that is, the UE starts this registration procedure for registration via non-3GPP access and adding 3GPP access), the new AMF registers in the UDM using Nudm_UECM_Registration and subscribes to the notification of the AMF when the UDM cancels the registration. The AMF searches for mobility subscription data using Nudm_SDM_Get and, when the mobility subscription data is modified, subscribes to the notification using Nudm_SDM_Subscribe. Where the GPSI (generic public subscription identifier) is available in the UE subscription data, the GPSI is provided from the UDM to the AMF of the subscription data.

The PEI is provided to the UDM in the update location procedure.

The new AMF provides the access type provided for the UDM for the UE, and the access type is set to "3GPP access." The UDM stores the associated access type along with the serving AMF.

14c. As indicated in step 14a, if the UDM stores the associated access type along with the serving AMF, and if this exists, the UDM may allow the old AMF corresponding to 3GPP access to initiate Nudm_UECM_DeregistrationNotification (refer to Ch. 5.2.3.2.2). The old AMF removes the UE's MM context. If the cause of removal of the serving NF indicated by the UDM is "initial registration," the old AMF invokes the "Namf_EventExposure_Notify" service operation for all the related SMFs of the UE to indicate that the UE has been unregistered from the old AMF. The SMF needs to release the PDU session when receiving the notification.

14d. The old AMF may cancel the subscription with the UDM for the subscription data using Nudm_SDM_unsubscribe.

15. Where the new AMF receives the PCF ID from the old AMF in step 5 and successfully contacts the PCF identified by the PCF ID, the new AMF searches for the dynamic policy from the PCF.

Where the PCF identified with the PCF ID cannot be used (e.g., no response from the PCF) or there is no PCF ID received from the old AMF in step 5, the AMF selects the PCF as described in TS 23.501 [2], 6.3.7.1.

16. [Optional] From AMF to PCF: Npcf_AMPolicyControl_Get (SUPI, GPSI).

Where the AMF has not yet obtained the access and mobility policy for the UE or he AMF's access and mobility policy is no longer valid, the AMF requests the PCF to apply the operator's policy for the UE from the PCF by the Npcf_AMPolicyControl_Get service operation (refer to Ch. 5.2.5.2.2). If possible, the AMF includes the GPSI. In the case of roaming, the interoperation between H(Home)-PCF and V (Visited)-PCF is needed for providing the access and mobility policy.

From PCF to new AMF: Response to Npcf_AMPolicyControl_Get (access and mobility policy data).

The PCF responds to the Npcf_AMPolicyControl_Get service operation and provides the access and mobility policy data for the UE to the AMF.

17. [Conditional] From AMF to SMF: Namf_EventExposure_Notify ( ) or Nsmf_PDUSession_UpdateSMContext ( ).

The AMF invokes Namf_EventExposure_Notify (refer to Ch. 5.2.2.3.4) or Nsmf_PDUSession_UpdateSMContext (refer to Ch. 5.2.8.2.6) in one or more of the following scenarios.

If the AMF is changed, the new AMF notifies each SMF of the new AMF serving the UE by providing the UE reachability state. When the AMF is changed, it is assumed that the old AMF provides the available SMF information. Where any PDU session status indicates that the PDU session is released in the UE, the AMF invokes the Nsmf_PDUSession_ReleaseSMContext service operation to the SMF to release any network resource related to the PDU session.

Where "PDU session to be reactivated" is included in the registration request of step 1, the AMF sends the Nsmf_PDUSession_UpdateSMContext request to the SMF related to the PDU session to activate the user plane connection of the PDU session. PDU session. The process after the fourth step described in Ch. 4.2.3.3 is executed to complete the user plane connection activation without sending an MM NAS service authorization to the (R)AN described in connection with the eighth step of Ch. 4.2.3.3 in the AMF.

If the UE is in MICO mode, the AMF notifies the SMF that UE is unreachable, and the SMF need not transmit a DL data notification to the AMF, the AMF notifies the SMF that the UE is reachable.

Where the AMF notifies the SMF that only regulatory prioritized services are reachable, and the UE enters the allowed area, the AMF notifies the SMF that the UE is reachable.

Where the UE is in a non-allowed area, and the PDU session to be reactivated is included in the registration request, the AMF sends a notification that all related SMF(s) of the UE may reach only regulatory prioritized services.

The AMF also notifies the NF(s), which have subscribed to UE reachability, of a change in the UE reachability.

Where the SMF subscribes to the UE location change notification via the Namf_EventExposure_Subscribe service operation, and the AMF detects an exit from the area of interest subscribed to by the SMF serving the UE, the AMF may invoke the Namf_EventExposure_Notify service operation, notifying the SMF of the UE's new location information. In the case of LADN location change notification, the AMF invokes the Namf_EventExposure_Notify service operation only when the detected LADN state (e.g., "inside LADN area" or "outside LADN area") differs from the last/latest notified LADN state. If the SMF is notified of the event, the last/latest notified LADN state is updated as detected LADN state.

Whether a notification Ack needs a separate message or is implemented in the transport layer is determined according to TS 29.518 [18].

The SMF may determine to trigger, e.g., new intermediate UPF insertion, removal, relocation, or UPF relocation (described in step 5, Ch. 4.2.3.2).

If the registration type indicated by the UE is periodic registration update, step 20 may be omitted.

If the serving AMF is changed, the new AMF needs to wait until step 17 is complete for all the SMFs related to the UE. Otherwise, steps 18 to 22 may continue in parallel with this step.

18. New AMF for N3IWF: N2 request ( ).

The AMF may determine to modify the NGAP UE-TNLA-binding towards N3IWF as described in 4.2.7.2. This is performed when the AMF is changed, and the old AMF has existing NGAP UE-TNLA-binding for N3IWF for the UE.

19. From N3IWF to new AMF: N2 Response ( ).

20. [Conditional] From old AMF to PCF: Npcf_AMPolicyControl_Delete 0.

Where the old AMF has previously requested the PCF to establish a UE context, the old AMF terminates the UE context in the PCF using the Npcf_AMPolicyControl_Delete service operation (refer to Ch. 5.2.5.2.4). From PCF to old AMF: Response to Npcf_AMPolicyControl_Delete ( ).

21. From new AMF to UE: Registration authorization (5G-GUTI, registration area, mobility restriction, PDU session status, allowed NSSAI, periodic registration update timer, LADN information and allowed MICO mode, PS (packet switched) session support indication).

The AMF transmits a registration authorization message, which indicates that registration has been approved, to the UE. Where the AMG assigns a new 5G-GUTI, the 5G-GUTI is included. Where the AMF assigns a new registration area, the registration area needs to be transmitted to the UE via a registration authorization message. Unless the registration authorization message includes the registration area, the UE needs to regard the previous registration area as valid. Where mobility restriction applies to the UE, a mobility restriction is included. The AMF indicates the PDU session established for the UE in the PDU session status. The UE locally removes any internal resource related to the PDU session, which is not yet received SMF response although the UE has requested to establish a PDU session and not marked as established in the received PDU session status. If the PDU session status information is in the registration request, the AMF needs to indicate the PDU session status.

The NSSAI includes allowed S-NSSAI. Where the UE subscription data includes subscribed LADN identification information, the AMF needs to include, in the registration authorization message, the LADN information for the LADN defined in TS 23.501 [2] 5.6.5 and available for the UE in the registration area determined by the AMF. If the UE includes the MICO mode in the request, the AMF responds to whether the MICO mode needs to be used. The AMF configures IMS (IT multimedia service) voice over PS session support indication as set forth in TS 23.501, Ch. 5.16.3.2 [2]. To configure the IMS voice over PS session support indication, the AMF needs to check the compatibility of UE and RAN wireless functions related to the IMS voice over PS by performing a UE/RAN radio information and compatibility request procedure as set forth in Ch. 4.2.8. If the AMF has not yet received a voice support consistent indicator from the NG-RAN, the AMF may set the PS session support indication to IMS voice according to an implementation and, in a subsequent step, update it.

In this step, the handover restriction list is provided by the AMF to the NG-RAN.

Where the 'follow on request' is included, the AMF should not release the signaling connection after the registration procedure has been complete.

22. [Conditional] From UE to new AMF: Registration complete ( ).

The UE identifies whether a new 5G-GUTI has been assigned by transmitting a registration complete message to the AMF.

When the "PDU session to be reactivated" is not included in the registration request, the AMF releases the signaling connection with the UE as per Ch. 4.2.6. Where the 'follow on request' is included in the registration request, the AMF should not release the signaling connection after the registration procedure has been complete.

FIG. 5 is a view illustrating a preparation phase in a handover according to an embodiment of the disclosure. In particular, FIG. 5 illustrates an example preparation step in an inter NG-RAN node N2-based handover.

1. S-RAN to S-AMF: Handover Required (Target ID, Source to Target transparent container, SM N2 info list, PDU Session IDs).

Target ID includes the selected PLMN ID.

Source to Target transparent container includes RAN information created by S-RAN to be used by T-RAN and is transparent to 5GC.

All PDU Sessions handled by S-RAN (i.e., all existing PDU Sessions with active UP connections) is included in the Handover Required message, indicating which of those PDU Session is requested by S-RAN to handover. The SM N2 information includes Direct Forwarding Path Availability, and which QoS Flow is subject to data forwarding.

Direct Forwarding Path Availability indicates whether direct forwarding is available from the S-RAN to the T-RAN. This indication from S-RAN includes the presence of IP connectivity and security association(s) between the S-RAN and the T-RAN.

2. T-AMF Selection: When the Source (S)-AMF is unavailable to provide the UE service anymore, the S-AMF selects the T-AMF as described in clause 6.4.5 on "AMF Selection Function" in TS 23.501 [2].

3. [Conditional] S-AMF to T-AMF: Namf_Communication_CreateUEContext Request (N2 Information (Target ID, Source to Target transparent container, SM N2 information list, Service area restriction), UE context information containing SUPI and/or the list of PDU Session IDs along with the corresponding SMF information).

The S-AMF initiates Handover resource allocation procedure by invoking the Namf_Communication_CreateUEContext service operation towards the T-AMF.

When the S-AMF is still unavailable to serve the UE, this step and step 12 are not needed.

In the case that Service area restrictions are available in the S-AMF, they may be forwarded to the T-AMF as described in clause 5.3.4.1.2 in TS 23.501.

4. [Conditional] T-AMF to SMF: Nsmf_PDUSession_UpdateSMContext (PDU Session ID, Target ID, T-AMF ID).

For each PDU Session indicated by S-RAN as an N2 Handover candidate, the AMF invokes the Nsmf_PDUSession_UpdateSMContext Request per PDU Session to the associated SMF.

PDU Session ID indicates a PDU Session candidate for N2 Handover. Target ID as the UE location information.

When the (T-)AMF detects that the UE moves into a non-allowed area based on Service area restrictions, the (T-)AMF notifies each SMF corresponding to the list of PDU Sessions received from the Handover Required message that the UE is only reachable for regulatory prioritized services.

5. [Conditional] Based on the Target ID, the SMF checks whether N2 Handover for the indicated PDU Session can be accepted. The SMF checks also the UPF Selection Criteria according to clause 6.3.3 of TS 23.501 [2]. In the case that the UE has moved out of the service area of the UPF connecting to RAN, the SMF selects a new intermediate UPF. In the case that the PDU Session corresponds to a LADN and the UE is outside the area of availability of the LADN, then the SMF moves to step 6c.

6a. [Conditional] SMF to T-UPF (intermediate): N4 Session Establishment Request.

In the case that the SMF selects a new intermediate UPF (i.e., the target UPF (T-UPF)) for the PDU Session and in the case that CN Tunnel Information is allocated by the T-UPF, an N4 Session Establishment Request message is sent to the T-UPF, and it is provided Packet detection, enforcement and reporting rules installed on the T-UPF. The PDU Session Anchor Tunnel Information for this PDU Session is also provided to the T-UPF.

6b. T-UPF (intermediate) to SMF: N4 Session Establishment Response.

The T-UPF sends an N4 Session Establishment Response message to the SMF with DL CN Tunnel Information and UL CN Tunnel Information (i.e., N3 tunnel information). The SMF starts a timer to release the resource of S-UPF to be used in step 12a of the Execution Phase.

When steps 6a and 6b are performed for a PDU Session, steps 6c and 6d are skipped.

6c, d. [Conditional] SMF to S-UPF: N4 Session Modification Request/Response.

In the case that the PDU Session corresponds to a LADN and the UE is outside the area of availability of the LADN, the SMF updates the N4 session of the UPF(s) corresponding to the PDU Session to deactivate the corresponding UP connection. The SMF may notify the UPF that originated the Data Notification to discard downlink data for the PDU Sessions and to not provide further Data Notification messages.

7. SMF to T-AMF: Nsmf_PDUSession_UpdateSMContext Response (PDU Session ID, SM N2 Information).

When N2 handover for the PDU Session is accepted, the SMF includes in the Nsmf_PDUSession_UpdateSMContext response the SM N2 Information containing the N3 UP address and the UL CN Tunnel ID of the UPF and the QoS parameters indicating that the SM N2 Information is for the Target NG-RAN.

In the case that N2 handover for the PDU Session is not accepted as described in step 4, the SMF does not include an SM N2 Information regarding the PDU Session to avoid establishment of radio resources at the target RAN. In the case that the SMF notifies that the UE is only reachable for regulatory prioritized services, the SMF does not include any SM N2 information regarding the PDU Session for non-regulatory prioritized services to avoid establishment of radio resources at the target RAN.

The SMF sends a Nsmf_PDUSession_UpdateSMContext response without including the CN Tunnel Info to the AMF for the PDU Session which is to be released, and then release the PDU Session in a separate procedure as defined in clause 4.3.4.

8. The AMF supervises the Nsmf_PDUSession_UpdateSMContext Response messages from the involved SMFs. The lowest value of the Maximum delay indication for the PDU Sessions that are candidates for handover provides the maximum time when AMF may wait for Nsmf_PDUSession_UpdateSMContext Response messages before continuing with the N2 Handover procedure. When the maximum wait time is expired or when all Nsmf_PDUSession_UpdateSMContext Response messages are received, the AMF continues with the N2 Handover procedure (Handover Request message in step 9).

The delay value for each PDU Session is locally configured in the AMF and different according to an implementation.

9. T-AMF to T-RAN: Handover Request (Source to Target transparent container, MM N2 Information, SM N2 Information list, Handover Restriction List).

T-AMF determines T-RAN based on Target ID. The T-AMF may allocate a 5G-GUTI valid for the UE in the AMF and target TAI.

Source to Target transparent container is forwarded as received from S-RAN. MM N2 Information includes, for example, security information and Handover Restriction List if available in the T-AMF.

SM N2 Information list includes SM N2. The SM N2 Information list may include SM N2 Information received from SMFs for the T-RAN in the Nsmf_PDUSession_UpdateSMContext Response messages received within allowed maximum delay supervised by the T-AMF mentioned in step 8. The SM N2 Information indicates which QoS Flows are subject to data forwarding.

Handover Restriction List is sent if available in the Target AMF.

10. T-RAN to T-AMF: Handover Request Acknowledge (Target to Source transparent container, SM N2 response list, PDU Sessions failed to be setup list, T-RAN SM N3 forwarding Information list).

Target to Source transparent container includes a UE container with an access stratum part and a NAS part. The UE container is sent transparently via T-AMF, S-AMF and S-RAN to the UE.

The information provided to the S-RAN also contains a list of PDU Session IDs indicating PDU Sessions failed to be setup and reason for failure (SMF decision, SMF response too late, or T-RAN decision).

The SM N2 response list includes, per each received SM N2 Information and by SMF accepted PDU Session for N2 Handover, a PDU Session ID and an SM N2 response indicating the PDU Session ID and whether the T-RAN accepted the N2 Handover request for the PDU Session. For each PDU Session accepted by the T-RAN for N2 Handover, the SM N2 response includes N3 UP address and Tunnel ID of the T-RAN.

The T-RAN SM N3 forwarding information list includes, per each PDU Session accepted by the T-RAN and has at least one QoS Flow subject for data forwarding, N3 UP address and Tunnel ID of T-RAN for receiving forwarded data if necessary.

11. [Conditional] T-AMF to SMF: Nsmf_PDUSession_UpdateSMContext Request (PDU Session ID, Cause).

In the case that an Nsmf_PDUSession_UpdateSMContext Response message arrives too late (refer to step 8), or the PDU Session with SMF involvement is not accepted by the T-RAN, this message is sent to the corresponding SMF allowing the SMF to deallocate a possibly allocated N3 UP address and Tunnel ID of the selected UPF. A PDU Session handled by that SMF is considered deactivated and handover attempt is terminated for that PDU Session.

12a. AMF to SMF: Nsmf_PDUSession_UpdateSMContext Request (PDU Session ID, SM N2 response, T-RAN SM N3 forwarding Information list).

For each SM N2 response received from the T-RAN (included in SM N2 response list), AMF sends the received SM N2 response to the SMF indicated by the respective PDU Session ID.

In the case that a new T-UPF is not selected, the SMF stores the N3 tunnel information of the T-RAN from the SM N2 response when N2 handover is accepted by the T-RAN.

12b. [Conditional] SMF to T-UPF: N4 Session Modification Request (T-RAN SM N3 forwarding Information list, indication to allocate a DL forwarding tunnel for indirect forwarding)

In the case that the SMF selected a T-UPF in step 6a, the SMF updates the T-UPF by providing the T-RAN SM N3 forwarding information list by sending a N4 Session Modification Request to the T-UPF.

In the case that indirect forwarding applies based on indication from NG-RAN and the UPF is relocated and in the case that the SMF decides to configure the indirect forwarding tunnel on the same T-UPF, the SMF also requests in the N4 Session Modification Request message to the T-UPF to allocate a DL forwarding tunnel for indirect forwarding.

The indirect forwarding may be performed via a UPF which is different from the T-UPF, and in this case the SMF selects a T-UPF for indirect forwarding.

12c. [Conditional] T-UPF to SMF: N4 Session Modification Response (T-UPF SM N3 forwarding Information list).

The T-UPF allocates tunnel information and returns an N4 Session Modification Response message to the SMF.

The T-UPF SM N3 forwarding information list includes T-UPF N3 address, T-UPF N3 Tunnel identifiers for forwarding data 12d. [Conditional] SMF to S-UPF: N4 Session Modification Request (T-RAN SM N3 forwarding Information list or T-UPF SM N3 forwarding Information list, indication to allocate a DL forwarding tunnel for indirect forwarding).

When the UPF is relocated, this message includes the T-UPF SM N3 forwarding information list. In the case that the UPF is not relocated, this message includes the T-RAN SM N3 forwarding information list.

In the case that indirect forwarding applies based on indication from NG-RAN, the SMF indicates in the N4 Session Modification Request message to the S-UPF to allocate a DL forwarding tunnel for indirect forwarding.

The indirect forwarding may be performed via a UPF which is different from the S-UPF.

12e. [Conditional] S-UPF to SMF: N4 Session Modification Response (S-UPF SM N3 forwarding Information list).

The S-UPF allocates tunnel information and returns an N4 Session establishment Response message to the SMF.

The S-UPF SM N3 forwarding Information list includes S-UPF N3 address, S-UPF N3 Tunnel identifiers for forwarding data for both UL and DL.

12f. SMF to T-AMF: Nsmf_PDUSession_UpdateSMContext Response (N2 SM Information).

The SMF transmits a Nsmf_PDUSession_UpdateSMContext Response message per PDU Session to T-AMF.

The SMF creates an N2 SM information containing the DL forwarding tunnel information to be sent to the S-RAN by the AMF. The SMF includes this information in the Nsmf_PDUSession_UpdateSMContext response. The DL forwarding tunnel information may be one of the following information:

In the case that direct forwarding applies, then the SMF includes the T-RAN N3 forwarding information the SMF received in step 12a.

In the indirect forwarding tunnel is setup in step 12b or 12d, then the SMF includes the T-UPF or S-UPF DL forwarding information containing the N3 UP address and the DL Tunnel ID of the UPF.

The SMF starts an indirect data forwarding timer, to be used to release the resource of indirect data forwarding tunnel.

13. [Conditional] T-AMF to S-AMF: Namf_Communication_CreateUEContext Response (N2 information necessary for S-AMF to send Handover Command to S-RAN including Target to Source transparent container, N2 SM information (PDU Sessions failed to be setup list, and the N3 DL forwarding Information)).

AMF supervises the Nsmf_PDUSession_UpdateSMContext Response message from the involved SMFs. At expiry of the maximum wait time or when all Nsmf_PDUSession_UpdateSMContext Response messages are received, the T-AMF sends the Namf_Communication_CreateUEContext Response to the S-AMF.

The Target to Source transport container is received from the T-RAN. The N2 SM Information is received from the SMF in step 12f.

FIG. 6 is a view illustrating an execution phase in an inter NG-RAN node N2-based handover according to an embodiment of the disclosure. In this figure, providing the AMF along with the UDM is not shown for simplicity purposes.

1. S-AMF to S-RAN: Handover Command (Target to Source transparent container, PDU Sessions failed to be setup list, SM forwarding info list).

Target to Source transparent container is forwarded as received from S-AMF.

The SM forwarding information list includes T-RAN SM N3 forwarding information list for direct forwarding or S-UPF SM N3 forwarding information list for indirect data forwarding.

The S-RAN uses the PDU Sessions failed to be setup list and the indicated reason for failure to decide whether to proceed with the N2 Handover procedure.

2. S-RAN to UE: Handover Command (UE container).

UE container is a UE part of the Target to Source transparent container which is sent transparently from the T-RAN via the AMF to the S-RAN and is provided to the UE by the S-RAN.

3. Uplink packet is sent from the T-RAN to the T-UPF and the UPF (PSA). Downlink packet is sent from the UPF (PSA) to the S-RAN via the S-UPF. The S-RAN needs to start forwarding of downlink data from the S-RAN towards the T-RAN for QoS Flows subject to data forwarding. This may be either direct (step 3a) or indirect forwarding (step 3b).

4. UE to T-RAN: Handover Confirm.

After the UE has successfully synchronized to the target cell, it sends a Handover Confirm message to the T-RAN. Handover is by this message considered as successful by the UE.

5. T-RAN to T-AMF: Handover Notify.

Handover is by this message considered as successful in T-RAN.

6a. [Conditional]T-AMF to S-AMF: Namf_Communication_N2InfoNotify.

The T-AMF notifies to the S-AMF about the N2 handover notify received from the T-RAN by invoking the Namf_Communication_N2InfoNotify.

A timer in S-AMF is started to supervise when resources in S-RAN shall be release.

6b. [Conditional]S-AMF to T-AMF: Namf_Communication_N2InfoNotify ACK.

The S-AMF acknowledges by sending the Namf_Communication_N2InfoNotify ACK to the T-AMF.

7a. [Conditional] From T-AMF to SMF: Namf_EventExposure_Notify

The T-AMF invokes the Namf_EventExposure_Notify service operation when the detected LADN state (e.g., "inside LADN area" or "outside LADN area") differs from the last notified LADN state. If the SMF is notified of the event, the last notified LADN state is updated with the detected LADN state.

7b. From T-AMF to SMF: Nsmf_PDUSession_UpdateSMContext Request (Handover Complete indication for PDU Session ID).

Handover Complete is sent per each PDU Session to the corresponding SMF to indicate the success of the N2 Handover.

The T-AMF also registers itself as the serving AMF with the UDM by using Nudm_UECM_Registration.

8a. [Conditional] SMF to T-UPF (intermediate): N4 Session Modification Request.

In the case that new T-UPF is inserted or an existing intermediate S-UPF is relocated, the SMF needs to send N4 Session Modification Request indicating DL AN Tunnel Information of T-RAN to the T-UPF.

8b. [Conditional] T-UPF to SMF: N4 Session Modification Response.

The T-UPF acknowledges by sending N4 Session Modification Response message to the SMF.

9a. [Conditional] SMF to S-UPF (intermediate): N4 Session Modification Request.

In the case that the UPF is not relocated, the SMF needs to send N4 Session Modification Request indicating DL AN Tunnel Information of T-RAN to the S-UPF.

9b. [Conditional] S-UPF to SMF: N4 Session Modification Response.

The S-UPF acknowledges by sending N4 Session Modification Response message to SMF.

10a. [Conditional] SMF to UPF (PSA): N4 Session Modification Request.

For non-roaming or local breakout roaming scenario, the SMF sends N4 Session Modification Request message to PDU Session Anchor UPF, UPF (PSA), and provides N3 AN Tunnel Information of T-RAN or the DL CN Tunnel Information of T-UPF. A new T-UPF is inserted or an existing intermediate S-UPF is relocated. In the case that the existing intermediate S-UPF terminating to N9 toward the H-UPF (PDU Session Anchor) is relocated for the home routed roaming scenario, the V-SMF invokes an Nsmf_PDUSession_Update Request service operation toward the H-SMF.

In the case that the T-UPF is not inserted or an existing intermediate S-UPF is not relocated, steps 10a and step 10b are skipped.

10b. [Conditional] UPF (PSA) to SMF: N4 Session Modification Response.

The UPF (PSA) sends N4 Session Modification Response message to SMF. In order to assist the reordering function in the T-RAN, the UPF (PSA) sends one or more "end marker" packets to each QoS Flow that require reordering on the previous path immediately after switching the path. The source UPF transmits the "end marker" packets to the source RAN. At this point, in the case that a new T-UPF is inserted or an existing intermediate S-UPF is relocated, the UPF (PSA) starts sending downlink packets to the T-RAN, via T-UPF. In case of home routed roaming scenario, the H-SMF responds with the Nsmf_PDUSession_Update Response service operation once the H-UPF (PDU Session Anchor) is updated with the UL tunnel information of the T-UPF.

When there are multiple UPFs (PSAs), step 10a and step 10b are performed for each UPF (PSA).

11. SMF to T-AMF: Nsmf_PDUSession_UpdateSMContext Response (PDU Session ID).

The SMF confirms reception of Handover Complete.

12. The UE may initiate mobility Registration procedure.

The target AMF knows that it is a Handover procedure and therefore the target AMF performs only a subset of the Registration procedure, specifically steps 5, 6 and 10 for the context transfer between the source AMF and the target AMF are skipped.

13a. [Conditional] SMF to S-UPF (intermediate): N4 Session Release Request.

In the case that there is a source intermediate UPF, the SMF initiates resource release after the timer in step 7 or an indirect data forwarding timer expires by transmitting an N4 Session Release Request (Release Cause) to the source UPF. This message is also used to release the indirect data forwarding resource in the S-UPF.

13b. S-UPF to SMF: N4 Session Release Response.

The S-UPF acknowledges with an N4 Session Release Response message to confirm the release of resources.

In case of indirect data forwarding, the resource of indirect data forwarding is also released.

14a. AMF to S-RAN: UE Context Release Command ( ).

After the timer in step 6a expires, the AMF sends UE Context Release Command.

14b. S-RAN to AMF: UE Context Release Complete ( ).

The source RAN releases its resources related to the UE and responds with a UE Context Release Complete ( ) message.

15a. [Conditional] SMF to T-UPF: N4 Session Modification Request.

In the case that indirect forwarding applies and the UPF is relocated, after timer of indirect data forwarding expires, the SMF sends N4 Session Modification Request to the T-UPF to release the indirect data forwarding resource.

15b. [Conditional] T-UPF to SMF: N4 Session Modification Response.

The T-UPF acknowledges with an N4 Session Modification Response message to confirm the release of indirect data forwarding resources.

Method of Supporting and Indicating LADN Service

FIG. 7 is a view illustrating a method of providing LADN information according to an embodiment of the disclosure.

1. The UE may perform a registration procedure by transmitting a registration request message to the AMF. At this time, the AMF may be an AMF where the UE-subscribed NDD1 has been configured. The UE's DNN subscription information may be provided/configured to/in the AMF by the UDM.

2. Upon authorizing the UE's registration request, the AMF may transmit a registration authorization message. At this time, if the UE-subscribed DNN1 includes an LADN, LADN information may be included in the registration authorization message. The LADN information may include an LADN service area (i.e., the intersection between the LADN service area and the latest registration area) where an LADN service is provided and/or an LADN DNN.

Where the LADN information is updated, the AMF may provide LADN information to the UE via a UE configuration update message/procedure.

FIG. 8 is a view illustrating a method of operating an AMF to report whether a UE is located in an LADN service according to an embodiment of the disclosure.

1-2. The SMF may subscribe to the UE mobility event notification for the LADN DNN. In this case, when the UE is located in the LADN service area, the AMF may send a "UE mobility event notification" to the SMF. Selectively, the AMF may notify the SMF of the UE's specific location information.

To that end, the AMF may send an inquiry/request as to whether the UE is present in the UE's location or area of interest to the NG-RAN. In response to the inquiry/request, the NG-RAN may transmit information as to whether the UE is in the area of interest and/or current UE location information (or UE location information obtained up to date along with a time stamp) to the AMF.

Or, even without such a request, UE location information configured/stored in the AMF may directly be transmitted to the SMF.

FIG. 9 is a view illustrating an AMF operation method of determining whether a UE is located in an area of interest according to an embodiment of the disclosure.

The AMF may determine whether the UE is in the area of interest ('IN,' 'OUT,' or "UNKNOWN") as follows.

1) Where determined to be 'IN':
Where the UE is inside the area of interest, and the UE is in the CM-CONNECTED state; or
Where the UE is located in a registration area included in the area of interest.

2) Where determined to be 'OUT':
Where the UE is outside the area of interest, but the area of interest is located in a valid (available) registration area, and the UE is in the CM-CONNECTED state; or
Where the UE is located in an invalid (unavailable) registration area.

3) Where determined to be 'UNKNOWN':
Where the UE is in the area of interest in the valid registration area, the area of interest does not include the whole registration area, and the UE is in the CM-IDLE state.

Depending on the result of the determination, the AMF may transmit a Namf_EventExposure_Notify message to the SMF.

Access to the DN via a PDU session for the LADN may be available only in a specific LADN service area. The LADN service area is a set of tracking areas. The LADN is a service provided by the UE's serving PLMN:

The LADN service is applied only to 3GPP access but not for home routed.
Use of the LADN DNN requires explicit subscription to the DNN or subscription to a wildcard DNN.
Whether the DNN corresponds to the LADN service is the attribute of the DNN.
The UE is configured to allow it to be known whether the DNN is an LADN DNN.
The LADN information (i.e., the LADN service area information and/or LADN DNN) is configured per DN by the AMF (that is, per UE accessing the same LADN). The configured LADN service area is irrelevant to other elements (e.g., the UE's registration area or UE subscription).
Where the LADN is unavailable in the TA of the AMF service area, the AMF need not have any LADN information configured for the DNN.
The LADN information is provided to the UE by the AMF during a registration procedure or UE configuration update procedure. For each LADN DNN configured in the AMF, the corresponding LADN service area includes a set of tracking areas that belong to the UE's current registration area (i.e., the intersection between the LADN service area and the current registration area). The AMF creates no registration area according to the LADN availability.
Thus, since the LADN service area may include a TA(s) outside the UE's registration area or the external area served by the AMF, the LADN service area information sent by the AMF to the UE may only include a subset of the full LADN service area.
When the UE performs a successful (re)registration procedure, the AMF may provide LADN information for the LADN available to the UE in the registration area in the registration authorization message to the BE based on the local configuration (e.g., via the OAM) regarding the LADN, the UE's location, and UE subscription information received from the UDM regarding the subscribed DNN. Unless the network provides the LADN information for the DNN during a subsequent registration update procedure, the UE deletes out any LADN information for such DNN.
When the LADN information for the UE is changed in the 5GC, the AMF needs to update the LADN information to the UE via a UE configuration update/registration procedure.
The UE takes the following actions based on the LADN information in the UE:
a) When the UE is outside the LADN service area, the UE:
Should not request to activate the UP connection of PDU session for the LADN DNN.
Should not authorize or change the PDU session for the LADN DNN.
Unless the UE receives an explicit SM PDU session release request message from the network, the existing PDU session for the LADN DNN need not be released.
b) When the UE is inside the LADN service area, the UE:
May request to establish/modify the PDU session for the LADN DNN.
May request to activate the UP connection of the existing PDU session for the LADN DNN.
The SMF supporting the DNN has information as to whether the DNN is an LADN DNN configured. The SMF may subscribe to the "UE mobility event notification" to report the presence of the UE in the area of interest by providing the LADN DNN to the AMF.
Based on the notification for the presence of the UE in the LADN service area (i.e., IN, OUT, or UNKNOWN) sent by the AMF, the SMF takes the following actions based on the operators policy:

a) Upon notifying the SMF of the presence of the UE in the LADN service area, the SMF should perform the following:
Immediately releases the PDU session; or
Deactivates the user plane connection for the PDU session while maintaining the PDU session and identifies whether the downlink data notification has been deactivated. The SMF may release the PDU session later.
b) When the notification that the LADN service area is present is sent to the SMF, the SMF needs to perform the following:
Identifies whether a downlink data notification is available;
Activates the UP connection by triggering the network trigger service request procedure for the LADN PDU session when the SMF receives downlink or data notification from the UPF.
c) The SMF may perform the following upon notifying the SMF that the presence of the UE in the LADN service area is UNKNOWN:
Identifies whether a downlink data notification is available;
Activates the UP connection by triggering the network trigger service request procedure for the LADN PDU session when the SMF receives downlink or data notification from the UPF.

According to the prior art, although an establishment of a PDU session for receiving an LADN service may be triggered/initiated/started from a UE, it may not be known specifically when the establishment of the PDU session of the UE occurs. That is, since the UE is not forced to establish a PDU session (and/or it is not clearly defined specifically when it needs to be initiated) even when the network is ready to provide an LADN service, the usability of the LADN service may be low.

Thus, a scheme for increasing the usability for a specific service (in particular, the LADN service) desired by the operator is proposed in the disclosure.

The disclosure described below may be configured with combinations of at least one or more embodiments, and the individual embodiments are described below for ease of description.

FIG. 10 is a flowchart illustrating an LADN indication method for a UE according to an embodiment of the disclosure.

1. The UE may obtain LADN information (LADN DNN and/or (LADN) service area information per LADN DNN) provided by the serving network node/AMF via a process of attaching/registration in the network. Selectively, the UE may configure, and be served by, a regular PDU session (e.g., an IMS PDU session for voice services and/or an internet PDU session for internet services).

2.-4. The LADN DN/AF may perform various operations to grasp the location of the UE by interoperations between the network nodes.

Aside from roaming, the LADN DN/AF may attempt to grasp the location of the UE/user that has subscribed to the LADN service provided from the service provider. Upon roaming, the LADN DN/AF may grasp the location based on the recognition number for the UE/user that has subscribed to the LADN service provided by the visited network in the roaming state according to a roaming agreement, rather than grasping the location of all the roaming UEs.

5. The network node may request the UE to set up/establish a PDU session based on the UE's obtained location information (in particular, when the UE enters the LADN service area). A specific embodiment therefor may be divided into 5a, 5b, and 5c below depending on which entity performs the network operation, and at least one of the following embodiments may be combined and applied.

5a. According to an embodiment, the LADN DN/AF may request the UE to set up/establish a PDU session for starting the service using a device triggering method. Specifically, the DN/AF may transmit an application trigger request message for triggering to provide a specific application/service to the UE through the NEF and AMF. In this case, the UE may start the procedure for requesting to set up/establish a PDU session without interoperation with the user, based on pre-configured LADN access allow information. At this time, a popup window for receiving an explicit input for actual access/service start from the user according to the operator's configuration/policy may be provided/displayed through the UE. For example, a popup window for inquiring whether to consent to provide/use a specific service or a uniform resource locator (URL) address for service connection may be provided. Such explicit input may be received by the application layer via an LADN application (or app).

5b. or 5c. According to an embodiment, proposed is a scheme in which the network node may determine/initiate/trigger the setup/establishment/use/generation of a LADN PDU session and, if necessary, the usability of the LADN service is increased by transmitting an LADN PDU session generation/establishment/setup indication to the UE. Such determination/initiation/triggering/indication may be performed by the PCF, NEF, AF, and/or AMF, and the LADN PDU session setup/establishment/use/generation may be determined/initiated/triggered/indicated based on one or more among the following pieces of information:
Whether to allow/reject LADN DN access depending on UE's/user's subscription information;
Whether to allow/reject use of LADN service per UE/user;
Location of UE/user and/or LADN service area information; and/or
Roaming context/whether roaming or not and/or policy for roaming UE/user, etc.

Such information may be transferred along with the LADN information when the LADN information is transmitted in step 1 or may be transferred to the network node separately/independently in other step.

A specific method of transferring the networks indication (LADN PDU session setup/establishment/use/generation indication) may be varied depending on the selective paths, like in 5b/5c, network operation entities, and/or message types.

In embodiment 5b, where the LADN PDU session is determined to be set up/established/used/generated, the PCF may transmit an LADN PDU initiation message for initiating/triggering the LADN PDU session setup/establishment/use/generation to the AMF. In this case, the AMF may transmit, to the UE, a paging/notification message including the LADN setup flag/bit/information indicating the LADN PDU session setup/establishment/use/generation to the UE. At this time, the LADN PDU initiation message and/or paging/notification message may include information for the cause of LADN PDU session setup/establishment/use/generation.

In embodiment 5c, where the LADN PDU session is determined to be set up/established/used/generated, the PCF may transmit an LADN PDU initiation message for initiating/triggering the LADN PDU session setup/establishment/use/generation to the AMF through the SMF. At this time, the LADN PDU initiation message may include 'request level/priority' information. Here, 'request level/priority' information means the priority information for the LADN PDU session setup/establishment/use/generation. In this case, the AMF may transmit, to the UE, a NAS command/message including the 'request level/priority' information and/or the LADN setup flag/bit/information indicating the LADN PDU session setup/establishment/use/generation to the UE.

In particular, in the embodiments, the information transferred to the UE for the LADN PDU session setup/establishment/use/generation may include information indicating the UE-initiated PDU session setup/establishment/use/generation and information (e.g., priority/significance/degree-of-compulsion information such as 'shall/should/may' for setup/establishment/use/generation, specific DNN) necessary for setup/establishment/use/generation. The information may addtionally include, explicitly/implicitly, information (i.e., the cause) indicating what LADN service the setup/establishment/use/generation of the UE-initiated PDU session is indicated for.

A step for receiving the above-described UE's/user's explicit input may be added/included between steps 5 and 6.

6. The UE and the network node may perform a procedure for UE-initiated PDU session explicitly/implicitly and, since it is a procedure initiated according to the network indication, some steps to be performed in the network node, such as identifying the LADN subscriber information, may be omitted.

Described below are a scheme of identifying the UE location based on the interoperations between the NEF and the UDM, other than the above-described UE location identification method based on the interoperations between the NEF and PCF, and detailed operations of the UDM.

In FIG. 11, the embodiments of the NEF service operation information flow set forth in TS23.502(v15.1.0), Ch. 4.15.3.2.3 may be merged.

FIG. 11 is a view illustrating a method of identifying the location of a UE based on interoperations with an NEF/UDM according to an embodiment of the disclosure.

1. The requester, in the instant embodiment AS(LADN DN/AF), may transmit the Nnef_EventExposure_Subscribe request, thereby subscribing to one or more monitoring events.

Event reporting information defines the requested reporting type (e.g., one-time reporting for monitoring event, periodic reporting, or event-based reporting). If the reporting event subscription is authorized by the NEF, the NEF may record/store the association between the event trigger and the requester ID.

The AS (LADN DN/AF) may subscribe to the locating-related event (network service operation, event of locating a specific UE) for the UE through the NEF to grasp the location of the UE to provide the LADN service. During this course, not only for the relevant UE but also for the UEs subscribing to a specific PLMN (e.g., where the location of a roaming subscriber is grasped, all inbound roamers from a specific PLMN where the roaming agreement has been entered into), the locating-related event (network service operation) may be subscribed to. For example, when the AS subscribes to the event (network service operation) through the NF, it may include information for explicitly/implicitly recognizing/identifying the PLMN in a specific message (e.g., a Nnef_EventExposure_Subscribe request) and send it (e.g., including specific PLMN (identification) information such as *@ PLMN-A using a wildcard).

Additionally, the AS (LADN DN/AF) may explicitly/implicitly provide information for indicating that the purpose of subscription to the event is to provide the LADN service. For example, the AS (LADN DN/AF) may include such information, as a separate parameter, in a specific message (e.g., a Nnef_EventExposure_Subscribe request) or implicit information (e.g., UE@LADN_PLMN-A 혹은 *@LADN_PLMN-A) in the recognizer of the UE that needs to identify the event. The purpose of including such information is to select the UE for which LADN service is available/allowed based on the LADN subscriber information in the subsequent procedure and to provide the result of the event.

2. The NEF may subscribe to the event received in response to the transmitted Nudm_EventExposure_Subscribe request via the UDM.

If the reporting event subscription is allowed by the UDM, the UDM/AMF may record/store the association between the event trigger and the requester ID. Otherwise, the UDM may keep on indicating the failure in step 4.

The NEF discovers and contacts/accesses the UDM including the UE subscriber information received from the AS. That is, the NEF may contact/access the UDM of the HPLMN based on the information received from the AS and, as described above in connection with step 1, subscribe to the locating-related event (network service operation and, in this case, an event for locating a specific UE) for all the UEs of a specific PLMN and/or a specific UE. The parameters included/required for event subscription have been described above.

3a. [Conditional] Where a requested event (e.g., monitoring of loss of connectivity) requires support by the AMF, the UDM may transmit a Namf_EventExposure_Subscribe to the AMF serving the requested user.

The UDM identifies whether the LADN service is allowed for the requested UE(s) based on subscriber information. The UDM may subscribe to the locating-related event (network service operation. In this case, an event of locating a specific UE) through the serving AMF to locate selected UE(s).

Since the LADN may be a service provided only via 3GPP access networks according to the assumptions for the conventional art, the UDM may grasp an access network additionally registered and subscribe to the locating-related event (network service operation. In this case, an event of locating a specific UE) through the serving AMF. For example, for a UE which has registered first in a non-3GPP access network, the UDM currently need not subscribe to the locating-related event through the serving AMF. Upon recognizing that the UE registers in a 3GPP access network later, the UDM may subscribe to a locating-related event (network service operation. In this case, an event of locating a specific UE) through the serving AMF. To that end, the UDM may maintain/manage a specific log (the UE's registration status log) (regarding the access network in which the UE has registered). That is, although not required to subscribe to the event through the serving AMF where the UE is currently in registration in the non-3GPP access, if the UE registers in the 3GPP access network later, the UDM needs to record/maintain information for initiating/performing subscription to the event through the serving AMF.

3b. [Conditional] The AMF acknowledges execution of the Namf_EventExposure_Subscribe.

4. The UDM acknowledges execution of the Nudm_EventExposure_Subscribe.

5. The NEF responds to the requester who has started the request, with an acknowledgement of execution of the Nnef_EventExposure_Subscribe.

6a. The UDM detects an occurrence of an event (according to an event) and reports the event to the NEF, where it previously subscribed to the event, via a Nudm_EventExposure_Notify message.

6b. [Conditional-varies depending on events] The AMF detects an occurrence of an event (according to an event) and reports the event to the NEF, where it previously subscribed to the event, via a Namf_EventExposure_Notify message.

7. The NEF transfers the reporting event received by the Nudm_EventExposure_Notify and/or Namf_EventExposure_Notify to the AS.

FIG. 12 is a flowchart illustrating an example method of supporting an LADN service by an AMF according to an embodiment of the disclosure. In relation to the flowchart, the above-described embodiments and their descriptions may apply in the same or similar manner, and no duplicate description is given.

First, the AMF may provide LADN information for LADN service to the UE (S1210). At this time, the LADN information may include LADN service area information and LADN DNN information. The LADN information may be provided to the UE via a registration procedure or UE configuration update procedure.

Next, the AMF may obtain location information for the UE (S1220). The AMF may obtain the UE location information via various embodiments, and the so-obtained UE location information may be provided to the AS via the embodiment described above in connection with FIG. 11. Additionally, the AMF may obtain the UE's subscriber information and/or whether it roams.

Next, when a PDU session is determined to be established to provide an LADN service based on the UE location information, the AMF may transmit a preset message including a request to establish a PDU session to the UE (S1220). Here, when the PDU session is determined to be established based on the location information about the UE may include when the location of the UE is inside an LADN service area included in the LADN service area information. Further, establishment of the PDU session may be determined based on whether to allow the UE to access the DN, whether to allow the UE to use an LADN service, the UE's subscriber information, and/or whether the UE roams in addition to the UE location information. The network node to determine to establish a PDU session may be the AMF, PCF, NEF, and/or DN/AF.

According to an embodiment, where the AMF transmits a preset message, it may receive an application trigger request message to trigger an LADN service from the DN/AF. In this case, the AMF may transfer the application trigger request message, as a preset message, to the UE.

According to another embodiment, where the AMF transmits the preset message, it may receive an LADN PDU initiation message to request to initiate the PDU session establishment from the PCF. In this case, the AMF may transmit a paging message, as a preset message, to the UE.

According to another embodiment, where the AMF transmits the preset message, it may receive an initiation message to request to initiate the PDU session establishment from the PCF. At this time, the initiation message may include priority information for PDU session establishment. In this case, the AMF may transmit a non-access stratum (NAS) message, as a preset message, to the UE, and the NAS message may include the priority information received from the PCF.

Lastly, the AMF may receive a request message (e.g., a NAS message) to initiate PDU session establishment from the UE (S1240). Thus, the UE initiated-PDU session establishment procedure may be performed and, as a result, a PDU session may be established.

FIG. 13 is a block diagram illustrating an AMF supporting an LADN service according to an embodiment of the disclosure. In relation to the flowchart, the description above in connection with FIG. 12 may apply in the same or similar manner, and no duplicate description is given.

The AMF 1300 may include a component/unit 1310 for providing LADN information to the UE, a component/unit 1320 for obtaining UE location information, a component/unit 1330 for requesting the UE to establish a PDU session, and/or a component/unit 1340 for receiving a PDU session establishment request message.

The components/units 1310 to 1340 of the AMF 1300 may be components/units configured to perform steps S1210 to S1240 of FIG. 12. Each component/unit may be configured as a hardware component/part and may correspond to a processor, memory, and/or communication module or a combination described below in connection with FIGS. 16 and 17.

FIG. 14 is a flowchart illustrating an LADN service reception method by a UE according to an embodiment of the disclosure. In relation to the flowchart, the above-described embodiments and their descriptions may apply in the same or similar manner, and no duplicate description is given.

First, the UE may receive LADN information for LADN service (S1410). At this time, the LADN information may include LADN service area information and LADN DNN information. The LADN information may be provided to the UE via a registration procedure or UE configuration update procedure.

Next, when a PDU session is determined to be established to provide an LADN service based on the UE location information, it may receive a preset message including a request to establish a PDU session from the AMF (S1420). When the PDU session is determined to be established based on the location information about the UE may include when the location of the UE is inside an LADN service area included in the LADN service area information. At this time, the network node to determine to establish a PDU session may be the AMF, PCF, NEF, and/or DN/AF.

As an embodiment of step S1420, where the UE receives a preset message, the UE may receive an application trigger request message to trigger an LADN service, as the preset message, from the DN/AF through the AMF.

As another embodiment of step S1420, if the AMF receives an LADN PDU initiation message to request to initiate the PDU session establishment from the PCF, the UE may receive a paging message, as a preset message, from the AMF.

As another embodiment of step S1420, when the AMF receives an initiation message for requesting to initiate to establish the PDU session from the PCF, and the initiation message includes priority information for establishing the PDU session, the UE may receive a non-access stratum (NAS) message including the priority information, as the preset message, from the AMF.

Lastly, the UE may determine to send a PDU session establishment request message based on, e.g., the content of the request of the pre-received message, additionally information necessary for PDU session configuration previously configured in the UE and the information obtained by the interoperation with the user. Based thereupon, the UE may transmit a request message for initiating to establish the PDU session to a network node (S1430). Thus, the UE initiated-PDU session establishment procedure may be performed and, as a result, a PDU session for LADN service may be established.

FIG. 15 is a block diagram illustrating a UE receiving an LADN service according to an embodiment of the disclosure. In relation to the flowchart, the description above in connection with FIG. 14 may apply in the same or similar manner, and no duplicate description is given.

The UE 1500 may include a component/unit 1510 for receiving LADN information, a component/unit 1520 for receiving a request to establish a PDU session, and/or a component/unit 1530 for transmitting a request message to initiate to establish a PDU session.

The components/units 1510 to 1530 of the UE 1500 may be components/units configured to perform steps S1410 to S1430 of FIG. 14. Each component/unit may be configured as a hardware component/part and may correspond to a processor, memory, and/or communication module or a combination described below in connection with FIGS. 16 and 17.

Devices to which the Disclosure May Apply

FIG. 16 is a block diagram illustrating a configuration of a communication device according to an embodiment of the disclosure.

Referring to FIG. 16, a wireless communication system includes a network node 1610 and multiple UEs 1620.

The network node 1610 includes a processor 1611, a memory 1612, and a communication module 1613. The processor 1611 may implement the afore-proposed functions, processes, embodiments, and/or methods. For ease of description, the processor 1611 may be described herein as identical to the network node 1610. Wired/wireless interface protocol layers may be implemented by the processor 1611. The memory 1612 is connected with the processor 1611 to store various pieces of information for driving the processor 1611. The communication module 1613 is connected with the processor 1611 to transmit and/or receive wireless signals. The network node 1610 may correspond to, e.g., a base station, MME, HSS, SGW, PGW, or application server. In particular, where the network node 1610 is a base station, the communication module 1613 may include a radio frequency (RF) unit for transmitting/receiving wireless signals.

The UE 1620 includes a processor 1621, a memory 1622, and a communication module (or RF unit) 1623. The processor 1621 may implement the afore-proposed functions, processes, embodiments, and/or methods. For ease of description, the processor 1611 may be described herein as identical to the UE 1620. Wireless interface protocol layers may be implemented by the processor 1621. The memory 1622 is connected with the processor 1621 to store various pieces of information for driving the processor 1621. The communication module 1623 is connected with the processor 1621 to transmit and/or receive wireless signals.

The memory 1612 and 1622 may be positioned inside or outside the processor 1611 and 1621 and be connected with the processor 1611 and 1621 via various known means. The network node 1610 (e.g., a base station) and/or the UE 1620 may have a single antenna or multiple antennas.

FIG. 17 is a block diagram illustrating a configuration of a communication device according to an embodiment of the disclosure.

In particular, FIG. 17 illustrates in greater detail the UE of FIG. 16.

Referring to FIG. 17, the UE may include a processor (or a digital signal processor (DSP)) 1710, an RF module (or RF unit) 1735, a power management module 1705, an antenna 1740, a battery 1755, a display 1715, a keypad 1720, a memory 1730, a subscriber identification module (SIM) card 1725 (which is optional), a speaker 1745, and a microphone 1750. The UE may include a single or multiple antennas.

The processor 1710 implements the functions, processes, and/or methods proposed above. Wireless interface protocol layers may be implemented by the processor 1710.

The memory 1730 is connected with the processor 1710 to store information related to the operation of the processor 1710. The memory 1730 may be positioned inside or outside the processor 1710 and be connected with the processor 1710 via various known means.

For example, the user inputs instruction information, e.g., a phone number, by voice activation using the microphone 1750 or by pressing (or touching) a button of the keypad 1720. The processor 1710 receives the instruction information and handles performing a proper function, e.g., calling at the phone number. Operational data may be extracted from the SIM card 1725 or the memory 1730. Further, the processor 1710 may display the instruction information or operational information on the display 1715 for convenience or user's recognition.

The RF module 1735 is connected with the processor 1710 to transmit and/or receive RF signals. The processor 1710 transfers instruction information to the RF module 1735 to initiate communication, e.g., to transmit a wireless signal constituting voice communication data. The RF module 1735 includes a receiver and a transmitter for receiving and transmitting wireless signals. The antenna 1740 functions to transmit and receive wireless signals. Upon receiving a wireless signal, the RF module 1735 transfers the signal for processing by the processor 1710 and convert the signal into a base-band signal. The processed signal may be converted into readable or audible information output via the speaker 1745.

In the aforementioned embodiments, the elements and characteristics of the disclosure have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the disclosure. Order of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the disclosure may be implemented in the form of a module, procedure or function for performing the aforementioned functions or operations. Software code may be stored in the memory and driven by the processor.

The memory may be located inside or outside the processor and may exchange data with the processor through a variety of known means.

In this specification, 'A and/or B' can be interpreted to mean 'at least one of A and(or) B.'

It is evident to those skilled in the art that the disclosure may be materialized in other specific forms without departing from the essential characteristics of the disclosure. Accordingly, the detailed description should not be construed as being limitative from all aspects, but should be construed as being illustrative. The scope of the disclosure should be determined by reasonable analysis of the attached claims, and all changes within the equivalent range of the disclosure are included in the scope of the disclosure.

INDUSTRIAL AVAILABILITY

The disclosure applied to a 3GPP LTE/LTE-A/NR (5G) system is primarily described as an example but may be applied to various wireless communication systems in addition to the 3GPP LTE/LTE-A/NR (5G).

The invention claimed is:

1. A method of supporting a local access data network (LADN) service of an access and mobility management function (AMF) in a wireless communication system, the method comprising:
providing LADN information for the LADN service to a user equipment (UE), the LADN information including LADN service area information and LADN data network name (DNN) information;
obtaining location information about the UE;
identifying that a PDU session for providing the LADN service is determined, by the AMF, a policy control function (PCF), a network exposure function (NEF), and/or a data network (DN)/application function (AF), to be established based on the location information;
receiving, from the DN/AF or the PCF, a first message;
transmitting, to the UE, a second message including a request for establishing the PDU session; and
receiving a request message to initiate establishing the PDU session from the UE,
wherein the first message comprises an application trigger request message to trigger the LADN service, an LADN PDU initiation message for requesting to initiate to establish the PDU session, or an initiation message for requesting to initiate to establish the PDU session including priority information related with establishing the PDU session, and
wherein the second message comprises the application trigger request message, a paging message, or a non-access stratum (NAS) message including the priority information.

2. The method of claim 1, wherein
the LADN information is provided to the UE through a registration procedure or a UE configuration update procedure.

3. The method of claim 2, wherein
when the PDU session is determined to be established based on the location information about the UE includes when a location of the UE is inside an LADN service area included in the LADN service area information.

4. The method of claim 3, wherein
the PDU session is determined to be established based on whether to allow the UE to access a data network (DN), whether to allow the UE to use an LADN service, and/or whether the UE roams in addition to the location information about the UE.

5. A method of receiving a local access data network (LADN) service by a UE in a wireless communication system, the method comprising:
receiving LADN information for the LADN service, the LADN information including LADN service area information and LADN data network name (DNN) information;
receiving a preset message including a request for establishing the PDU session from an access and mobility management function (AMF), based on a PDU session for providing the LADN service being determined, by the AMF, a policy control function (PCF), a network exposure function (NEF), and/or a data network (DN)/application function (AF), to be established based on the location information; and
transmitting a request message for initiating to establish the PDU session to a network node,
wherein the preset message comprises an application trigger request message from the DN/AF for triggering the LADN service, a paging message that is transmitted from the AMF upon the AMF receives an LADN PDU initiation message for requesting to initiate to establish the PDU session from the PCF, or a non-access stratum (NAS) message including priority information that is transmitted from the AMF upon the AMF receives an initiation message for requesting to initiate to establish the PDU session from the PCF including the priority information.

6. The method of claim 5, wherein
when the PDU session is determined to be established based on the location information about the UE includes when a location of the UE is inside an LADN service area included in the LADN service area information.

7. A UE receiving a local access data network (LADN) service in a wireless communication system, the UE comprising:
a communication module for transmitting/receiving a signal; and
a processor controlling the communication module, wherein
the processor:
receives LADN information for the LADN service, the LADN information including LADN service area information and LADN data network name (DNN) information;
receive a preset message including a request for establishing the PDU session from an access and mobility management function (AMF), based on a PDU session for providing the LADN service being determined, by the AMF, a policy control function (PCF), a network exposure function (NEF), and/or a data network (DN)/application function (AF), to be established based on the location information; and
transmit a request message for initiating to establish the PDU session to a network node,. wherein the preset message comprises an application trigger request message from the DN/AF for triggering the LADN service, a paging message that is transmitted from the AMF upon the AMF receives an LADN PDU initiation message for requesting to initiate to establish the PDU session from the PCF, or a non-access stratum (NAS) message including priority information that is transmitted from the AMF upon the AMF receives an initiation message for requesting to initiate to establish the PDU session from the PCF including the priority information.

* * * * *